(12) United States Patent
Cho et al.

(10) Patent No.: US 9,952,706 B2
(45) Date of Patent: Apr. 24, 2018

(54) FLEXIBLE DEVICE FOR PROVIDING BENDING INTERACTION GUIDE AND CONTROL METHOD THEREOF

(71) Applicant: SAMSUNG ELECTRONICS CO., LTD., Suwon-si (KR)

(72) Inventors: Shi-yun Cho, Anyang-si (KR); Chang-soo Lee, Seosan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/954,322

(22) Filed: Jul. 30, 2013

(65) Prior Publication Data

US 2014/0028597 A1 Jan. 30, 2014

(30) Foreign Application Priority Data

Jul. 30, 2012 (KR) ........................ 10-2012-0083241

(51) Int. Cl.
*G06F 3/041* (2006.01)
*G06F 3/0482* (2013.01)
(Continued)

(52) U.S. Cl.
CPC .......... *G06F 3/0416* (2013.01); *G06F 1/1652* (2013.01); *G06F 3/017* (2013.01); *G06F 3/0482* (2013.01); *G06F 3/0487* (2013.01); *G06F 3/04817* (2013.01); *G06F 3/04842* (2013.01); *G06F 3/04895* (2013.01);
(Continued)

(58) Field of Classification Search
CPC ........ G06F 1/1652; G06F 3/016; G06F 3/017; G06F 3/041; G06F 3/04883; G06F 3/0488; G06F 3/0412; G06F 3/0482; G06F 3/04842; G06F 3/04845; G06F 3/0484; G06F 3/04847; G06F 3/04817;
(Continued)

(56) References Cited

U.S. PATENT DOCUMENTS 8,581,859 B2  11/2013  Okumura et al.
8,654,075 B2 *  2/2014  Kim .................... H04M 1/0206
                                                              345/156
(Continued)

FOREIGN PATENT DOCUMENTS

CN   102566816 A   7/2012
EP   2 474 973 A1  7/2012
(Continued)

OTHER PUBLICATIONS

International Search Report (PCT/ISA/210), dated Nov. 25, 2013, issued by the International Searching Authority in counterpart International Patent Application No. PCT/KR2013/006849.
(Continued)

*Primary Examiner* — Dismery Mercedes
(74) *Attorney, Agent, or Firm* — Sughrue Mion, PLLC

(57) ABSTRACT

A flexible apparatus with a bending interaction guide is provided. The flexible apparatus includes a sensor which senses a bending that deforms the shape of the flexible apparatus, and a controller which performs a controlling operation corresponding to the bending, when a previously set bending is sensed. The controller adds and provides the bending interaction guide based on a bending set with respect to each of the objects that are displayed on a screen.

21 Claims, 47 Drawing Sheets

(51) Int. Cl.
*G06F 3/0487* (2013.01)
*G06F 1/16* (2006.01)
*G06F 3/01* (2006.01)
*G06F 3/0481* (2013.01)
*G06F 3/0484* (2013.01)
*G06F 3/0489* (2013.01)
*H04M 1/02* (2006.01)
*G06F 9/44* (2018.01)
*H04M 1/725* (2006.01)

(52) U.S. Cl.
CPC ......... *H04M 1/0268* (2013.01); *G06F 3/0481* (2013.01); *G06F 9/4446* (2013.01); *H04M 1/72569* (2013.01)

(58) Field of Classification Search
CPC ......... G06F 3/0481; G06F 2203/04102; G06F 21/36; G09G 2380/02; G09G 2354/00
See application file for complete search history.

(56) References Cited

U.S. PATENT DOCUMENTS

| | | | | |
|---|---|---|---|---|
| 8,712,477 | B2* | 4/2014 | Yu | G06F 3/0481 455/566 |
| 8,745,514 | B1* | 6/2014 | Davidson | G06F 3/0487 345/173 |
| 8,928,619 | B1* | 1/2015 | Cho | G06F 1/1652 345/173 |
| 8,994,651 | B2* | 3/2015 | Park | G09G 3/001 345/156 |
| 9,395,900 | B2* | 7/2016 | Bae | G06F 3/04817 |
| 9,448,660 | B2* | 9/2016 | Seo | G06F 3/0487 |
| 9,823,707 | B2* | 11/2017 | Paasovaara | G06F 1/1684 |
| 2006/0001650 | A1* | 1/2006 | Robbins | G06F 3/0421 345/173 |
| 2006/0238494 | A1* | 10/2006 | Narayanaswami | G06F 3/002 345/156 |
| 2007/0085845 | A1 | 4/2007 | Kikuchi et al. | |
| 2007/0247422 | A1* | 10/2007 | Vertegaal | G06F 3/017 345/156 |
| 2010/0011291 | A1* | 1/2010 | Nurmi | G06F 3/0414 715/702 |
| 2010/0045705 | A1* | 2/2010 | Vertegaal | A47G 19/2227 345/661 |
| 2010/0117975 | A1* | 5/2010 | Cho | G06F 1/1626 345/173 |
| 2010/0120470 | A1* | 5/2010 | Kim | G06F 1/1615 455/566 |
| 2010/0141605 | A1* | 6/2010 | Kang | G06F 1/1626 345/174 |
| 2010/0164888 | A1 | 7/2010 | Okumura | |
| 2011/0187681 | A1 | 8/2011 | Kim et al. | |
| 2011/0227822 | A1* | 9/2011 | Shai | G06F 1/1615 345/156 |
| 2012/0054620 | A1 | 3/2012 | Tilley et al. | |
| 2012/0054663 | A1* | 3/2012 | Baek | G06F 9/4443 715/772 |
| 2012/0115422 | A1* | 5/2012 | Tziortzis et al. | 455/73 |
| 2012/0133621 | A1* | 5/2012 | Kim | H04M 1/0206 345/204 |
| 2012/0139834 | A1* | 6/2012 | Han | G06F 3/03 345/157 |
| 2013/0016129 | A1* | 1/2013 | Gossweiler, III | G06F 3/012 345/667 |
| 2013/0057764 | A1* | 3/2013 | Choi | H04N 21/42222 348/563 |
| 2013/0093660 | A1* | 4/2013 | Hirsch | G06F 1/1694 345/156 |
| 2013/0296000 | A1* | 11/2013 | Park | G09G 3/001 455/566 |
| 2014/0071043 | A1* | 3/2014 | Jung | G06F 3/03 345/156 |

FOREIGN PATENT DOCUMENTS

| | | |
|---|---|---|
| JP | 2006-120096 A | 5/2006 |
| JP | 2007-108441 A | 4/2007 |
| JP | 2010-157060 A | 7/2010 |
| KR | 10-2010-0019164 A | 2/2010 |

OTHER PUBLICATIONS

Written Opinion (PCT/ISA/237), dated Nov. 25, 2013, issued by the International Searching Authority in counterpart International Patent Application No. PCT/KR2013/006849.
Lahey, Byron, et al., "PaperPhone: Understanding the Use of Bend Gestures in Mobile Devices with Flexible Electronic Paper Displays," ACM New York, NY, USA, ISBN: 978-1-4503-0228-9, May 12, 2011, pp. 1303-1312.
Communication from the Australian Patent Office issued Sep. 1, 2015 in a counterpart Australian Application No. 2013297228.
Communication dated Apr. 6, 2016 issued by Australian Intellectual Property Office in counterpart Australian Patent Application No. 2013297228.
Communication dated May 16, 2016 issued by the Russian Patent Office in counterpart Application No. 2015106548/08.
Communication dated Nov. 8, 2016 issued by the European Patent Office in counterpart European Patent Application No. 13178611.3.
Communicated dated Dec. 20, 2016, issued by the Russian Patent Office in counterpart Russian Application No. 2015106548.
Communication dated Feb. 21, 2017, issued by the Taiwanese Patent Office in counterpart Taiwanese Application No. 102126035.
Communication dated Apr. 26, 2017, issued by the State Intellectual Property Office of the People's Republic of China in counterpart Chinese Patent Application No. 201310325770.9.
Communication dated Apr. 26, 2017, issued by the Australian Patent Office in counterpart Australian Patent Application No. 2016206346.
Communication dated Jul. 10, 2017, issued by the Japanese Patent Office in counterpart Japanese Patent Application No. 2013-157856.
Communication dated Aug. 24, 2017 by the Australian Patent Office in corresponding AU Application No. 2016206346.
Communication dated Dec. 20, 2017, issued by the Chinese Patent office in counterpart Chinese application No. 201310325770.9.
Communication dated Feb. 9, 2018, issued by the Japanese Patent Office in counterpart Japanese application No. 2013-157856.

\* cited by examiner

FIG. 31
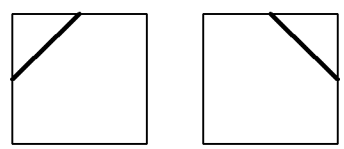
(a) (b) (c) (d)
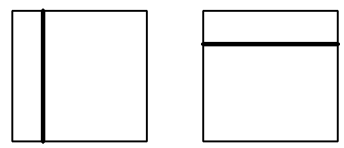
(e) (f) (g) (h)
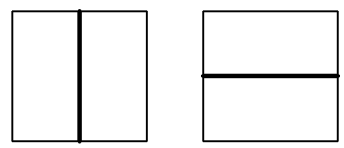
(i) (j) (k) (l)

FIG. 32
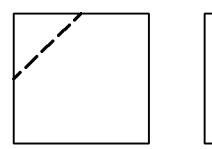  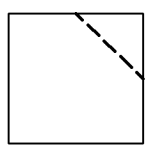  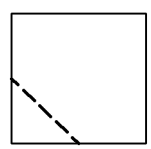  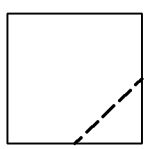
(a)　　　(b)　　　(c)　　　(d)
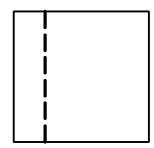  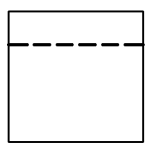  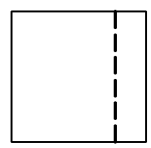  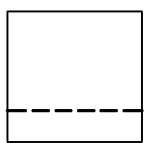
(e)　　　(f)　　　(g)　　　(h)
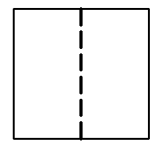  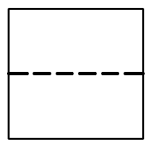  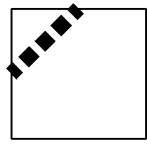  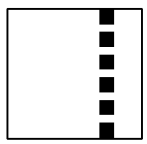
(i)　　　(j)　　　(k)　　　(l)

(a)  (b)  (c)  (d)

FIG. 34
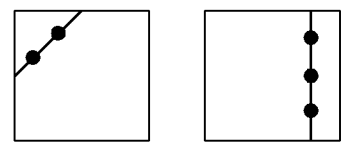
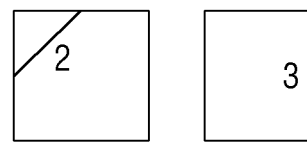
(a)  (b)  (c)  (d)
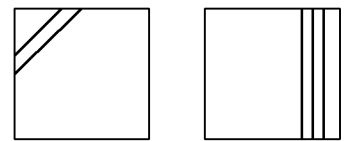
(e)  (f)

FIG. 35
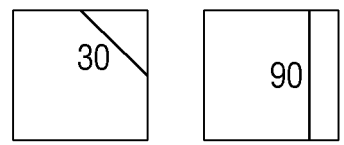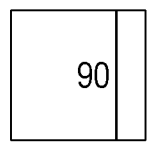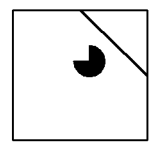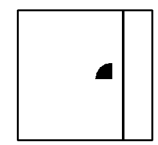
(a)  (b)  (c)  (d)

(a)    (b)

FIG. 37
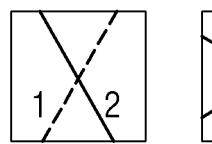 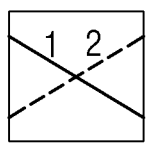 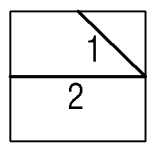 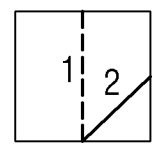
(a) (b) (c) (d)

(a)     (b)     (c)     (d)

FLEXIBLE DEVICE FOR PROVIDING BENDING INTERACTION GUIDE AND CONTROL METHOD THEREOF

CROSS-REFERENCE TO RELATED APPLICATIONS

This application claims priority from Korean Patent Application No. 10-2012-0083241, filed on Jul. 30, 2012 in the Korean Intellectual Property Office, the disclosure of which is incorporated herein by reference in its entirety.

BACKGROUND

1. Field

Methods and apparatuses consistent with the exemplary embodiments relate to a flexible device and more specifically, a flexible device which provides a bending interaction guide corresponding to bending and a control method thereof.

2. Description of the Related Art

With the development of electronic technologies, various types of display apparatuses have been developed. Specifically, display apparatuses such as televisions (TVs), personal computers (PC), lap-top computers, tablet PCs, cellular phones, or MP3 players are distributed and used by most families at home.

Recently, in order to meet user needs when the users request newer and a variety of functions, efforts are made to develop display apparatuses to be in a newer form. So-called, 'next generation displays' is one of such efforts.

There is a flexible display apparatus for example among the next generation displays. The flexible display apparatus indicates apparatus which has bending features.

The flexible display apparatus may be easily bent, which is different from related art display apparatuses. Accordingly, various input methods using bending features other than in the related art may be applied. When bending input methods are applied, a user can control operations of the apparatus by bending one part of the flexible display apparatus. For example, when a user bends an edge part, operation of turning a page into a next page can be performed.

Accordingly, in order to control the flexible display apparatus with a bending operation, a user has to be aware of the bending types and corresponding operations. However, when the user is a child or a senior who is not accustomed to inputting bending operations, the user may have difficulties in understanding the inputting methods. Further, when functions matched with various types of bending are provided, even a general user may have a problem in efficiently using the bending operations.

Therefore, a technology to use bending efficiently is necessary.

SUMMARY

Exemplary embodiments of the present application overcome the above disadvantages and other disadvantages not described above. Also, the exemplary embodiments are not required to overcome the disadvantages described above, and an exemplary embodiment may not overcome any of the problems described above.

According to an exemplary embodiment, a technical objective is to provide a flexible apparatus which provides a user with a bending interaction guide so that a user can easily recognize supportable bending, and a control method thereof.

According to an exemplary embodiment, a flexible apparatus is provided, which may include a sensor configured to sense a bending that deforms the shape of the flexible apparatus, and a controller configured to perform a controlling operation corresponding to the bending, when a previously set bending operation is sensed.

The controller may add and provide a bending interaction guide regarding a bending which is set with respect to each of the objects that are displayed on a screen.

In one exemplary embodiment, the flexible apparatus may additionally include an interface which connects to a display apparatus. The controller may transmit information regarding the objects and the bending interaction guide added to the objects, and transmit controlling signals instructing a controlling operation corresponding to the bending to the display apparatus, when the bending is sensed.

The flexible apparatus may additionally include a graphic processor which constitutes a screen including at least one of the objects respectively added with the bending interaction guide, and a display which displays the screen.

The bending interaction guide may visually express bending uniquely set with respect to each object.

The bending interaction guide may visually express bending differently set according to the displayed position of each object on the screen.

When the screen is converted, the controller may equally set the bending, which is previously set with respect to each displayed position of each object on the screen, to new objects which are newly displayed after converting according to the displayed position thereof, and add and display the bending interaction guide regarding the bending set with respect to the new objects to the new objects.

Further, the objects may be application icons, and the controller may implement an application corresponding to the objects, when a bending set with respect to the objects is sensed.

The screen may include an input area to input characters or symbols, the objects may be objects that select buttons to input the characters and the symbols, and the controller may display characters or symbols corresponding to the object on the input area, when bending set with respect to the object is sensed.

The bending interaction guide may include a line image guide in which at least one of a line width, a line number, a line shape, a line direction, a line position, a line angle, a line color, a line size, and a line length may be adjusted according to characteristic of the bending.

The bending interaction guide may additionally include at least one of a character guide and a symbol guide which are displayed with the line image guide.

In one exemplary embodiment, a control method of a flexible apparatus is provided, which may include providing a screen which comprises an object added with a bending interaction guide regarding a bending, sensing a bending which deforms the shape of the flexible apparatus, and performing an operation corresponding to the object, when bending set with respect to the object displayed on the screen is sensed.

The providing the screen may include transmitting information regarding the object and the bending interaction guide added to the object to a display apparatus which is connected to the flexible apparatus, and displaying the screen through the display apparatus.

The providing the screen may additionally include constituting a screen which comprises one or more objects respectively added with the bending interaction guide, and displaying the screen through a display mounted on the flexible apparatus.

The bending interaction guide may visually express bending uniquely set with respect to each object.

The bending interaction guide may visually express bending differently set according to the marking position of each object on the screen.

The control method may additionally include, when converting the screen is performed, equally setting the bending, which is previously set with respect to each displayed position of each object on the screen before converting, to new objects which are newly displayed after converting according to displayed position thereof, and adding and displaying the bending interaction guide regarding bending set with respect to the new objects to the new objects.

The objects may be application icons, and the performing operations may include implementing an application corresponding to the object, when a bending set with respect to the object is sensed.

The screen may include an input area to input characters or symbols, the objects may express select buttons to input the characters or the symbols, and the performing operations may include displaying characters or symbols corresponding to the object on the input area, when a bending set with respect to the object is sensed.

The bending interaction guide may include a line image guide in which at least one of a line width, a line number, a line shape, a line direction, a line position, a line angle, a line color, a line size, and a line length may be adjusted according to a characteristic of the bending.

The bending interaction guide may additionally include at least one of a character guide and a symbol guide which are displayed with the line image guide.

In one exemplary embodiment, a method of operating a display apparatus is provided, which may include displaying objects added with bending interaction guides, receiving a controlling signal corresponding to a bending from a flexible apparatus which is bendable, and performing a controlling operation according to the controlling signal. The bending interaction guide may be a guide image which visually expresses a bending set with respect to each object.

According to the various exemplary embodiments, a user can recognize bending and operations to be performed according to the bending more easily through the bending interaction guide. Therefore, the flexible apparatus can be utilized more conveniently and efficiently.

BRIEF DESCRIPTION OF THE DRAWINGS

The above and/or other aspects of the application will be more apparent by describing certain exemplary embodiments with reference to the accompanying drawings, in which:

FIGS. 31 to 38 illustrate various exemplary embodiments of bending interaction guide;

DETAILED DESCRIPTION OF EXEMPLARY EMBODIMENTS

Figure 1:
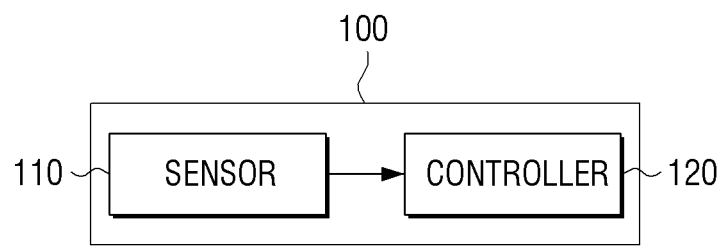
FIG. 1 is a block diagram of a flexible apparatus according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the exemplary embodiments with unnecessary detail.

Referring to the attached drawings, the exemplary embodiments will be described in detail below.

FIG. 1 is a block diagram of a flexible apparatus according to an exemplary embodiment. A flexible apparatus 100 of FIG. 1 has features in which the apparatus is bent by intensity and direction of the external power, when power is provided externally.

Referring to FIG. 1, the flexible apparatus 100 includes a sensor 110 and a controller 120. The sensor 110 senses a bending which bends the flexible apparatus 100. The 'bending' as used herein indicates an act of a user that makes a main body of the flexible apparatus 100 bend to a specific shape.

The controller 120 performs a controlling operation corresponding to the bending operation, when a preset bending is sensed. The controlling operation may be variously set according to the types and features of the flexible apparatus 100. For example, when the flexible apparatus 100 is a flexible display apparatus including a display (not illustrated), the controller 120 performs a controlling operation which turns on the flexible apparatus 100, when bending corresponding to a turn-on action is sensed. When the flexible apparatus 100 is implemented as remote controller which controls an external display apparatus, the controller 120 generates controlling signals to turn on the external display apparatus and transmit the controlling signals to the external display apparatus, when bending corresponding to turn-on action is sensed.

The controller 120 provides a bending interaction guide to express or display bending. The 'bending interaction guide' as used herein indicates a visual guide image to be displayed so that a user can intuitively recognize shapes of the flexible apparatus 100 which can be bent. The bending interaction guide may be overlapped and expressed with objects displayed on a screen. Specifically, the bending interaction guide may be mapped and displayed above respective objects displayed on a screen such as application icons, menus, or buttons.

As described above, the flexible apparatus 100 may be implemented as a flexible display apparatus including a display or simple flexible apparatus connected to an external display apparatus. When implemented as an apparatus connected to an external display apparatus, the bending interaction guide may be displayed with objects on a screen of the external display apparatus. Related exemplary embodiments will be specifically explained in a later part of the specification; an exemplary embodiment in which a flexible apparatus is implemented as flexible display apparatus will be specifically explained below.

Figure 2:
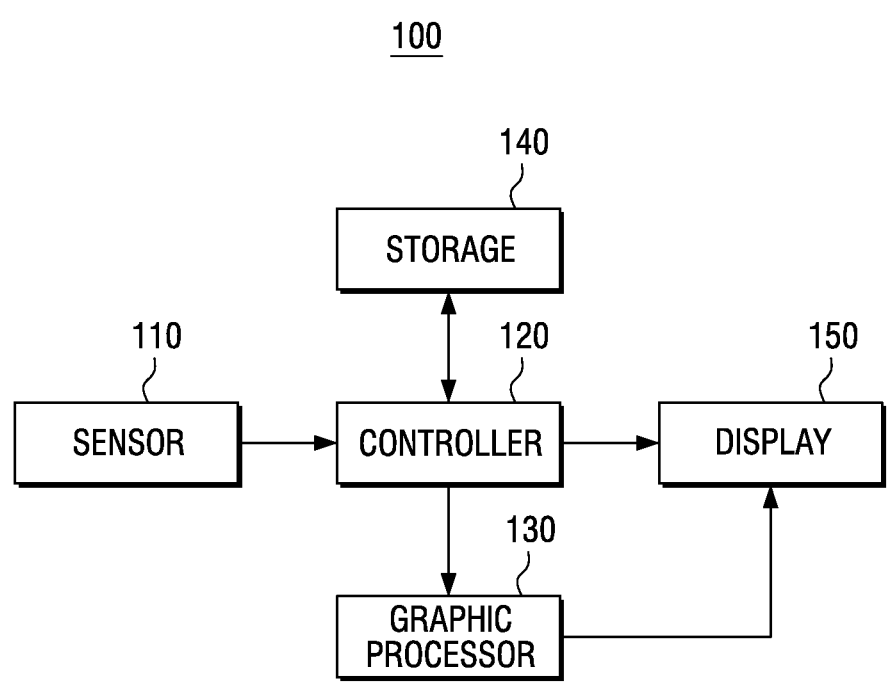
FIG. 2 is a block diagram of a flexible display apparatus according to an exemplary embodiment.

FIG. 2 is a block diagram of a flexible display apparatus according to an exemplary embodiment. The flexible display apparatus indicates an apparatus which can be curved, bent, folded, or rolled like a paper while keeping the display features that other display apparatuses have.

Referring to FIG. 2, the flexible display apparatus 100 includes a sensor 110, a controller 120, a graphic processor 130, a storage 140, and a display 150.

The sensor 110 operates to sense a bending operation inputted to bend the flexible display apparatus. The bending may include 'bending & flat' which bends and spreads, 'bending & hold' which keeps a bent situation, 'twist' which twists the flexible display apparatus, 'folding' which folds the apparatus, 'rolling' which rolls the apparatus toward one direction, 'shaking' which shakes the apparatus with one hand holding the apparatus, and 'swing' which swings the apparatus with both hands holding the apparatus. The sensor 110 may sense a bending of the display apparatus by using respective sensors mounted on the overall area of the flexible display apparatus 100. Specific sense methods will be described below.

The controller 120 determines whether the bending is a bending of a preset shape, when bending is sensed by the sensor 110. When the bending is the preset shape, the controller 120 performs a controlling operation corresponding to the bending.

Information regarding the bending and information regarding the controlling operations corresponding to the bending may be stored in the storage 140. The controller 120 may perform controlling operations based on information stored in the storage 140.

The graphic processor 130 constructs a screen including at least one of the objects which the bending interaction guide is added to respectively. Herein, objects may be implemented as various types such as menus and buttons as well as application icons.

The graphic processor 130 calculates display situation values of the bending interaction guide according to the types of objects. Display situation values may be various feature values such as position, format, size and color of objects to which the bending interaction guide will be marked. The graphic processor 130 generates bending interaction guide by rendering based on the calculated values, when display situation values are calculated.

The bending interaction guide may be uniquely set with respect to each object or per a marking position on a screen. Marking methods and types regarding objects and the bending interaction guide will be described below.

The display 150 displays the screen constituted by the graphic processor 130. The display 150 may be mounted on a front surface of the flexible display apparatus, and may display respective screens. The display 150 consists of flexible materials and can be deformed freely.

Figure 3:
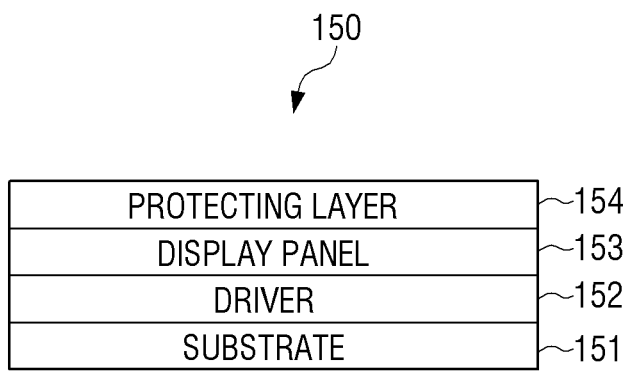
FIG. 3 is a diagram which illustrates a detailed constitution of a display 150 mounted within the flexible display apparatus of FIG. 2.

FIG. 3 is a diagram provided to explain an example of the display 150.

Referring to FIG. 3, the display 150 includes a substrate 151, a driver 152, a display panel 153, and a protecting layer 154.

The substrate 151 may be implemented as a plastic substrate such as a polymer film that can be deformed by external pressure. The plastic substrate has a structure in which both sides of base film are processed with a barrier coating. Base film may be implemented as resin such as polyimide (PI), polycarbonite (PC), polyethyleneterephtalate (PET), polyethersulfone (PES), polyethylenenaphthalate (PEN), or fiber reinforced plastic (FRP). Barrier coating is performed on sides which face each other in base film, and organic film or inorganic film may be used to keep flexibility.

Materials having flexible features such as thin glass or metal foil may be used for the substrate 151 as well as plastic substrate.

The driver 152 performs a function of driving the display panel 153. Specifically, the driver 152 applies a driving voltage to a plurality of pixels constituting the display panel 153, and may be implemented as a-si, TFT, low temperature polysilicon (LTPS) TFT, and organic TFT (OTFT). The driver 152 may be implemented as various types according to implementing types of the display panel 153. For example, the display panel 153 may consist of an organic emitting diode which constitutes a plurality of pixel cells and an electrode which covers both sides of the organic emitting diode. In this case, the driver 152 may include a plurality of transistors corresponding to each of the pixel cells in the display panel 153. The controller 120 emits the pixel cells connected to the transistors by approving electrical signals to gates of the transistors respectively. Therefore, an image may be displayed.

Further, the display panel 153 may be implemented as EL, electrophoretic display (EPD), electrochromic display (ECD), liquid crystal display (LCD), AMLCD, and plasma display panel (PDP) as well as organic emitting diode. However, when implemented as a LCD, a separate backlight may be necessary because the LCD cannot emit light by itself. When the backlight is not provided, surrounding lights are used with the LCD. Thus, in order to use the LCD display panel 153 without the backlight, conditions in which the light amount is substantial, such as outdoor environment, should be provided.

The protecting layer 154 performs a function which protects the display panel 153. For example, materials such as $ZrO$, $CeO_2$, or $ThO_2$ may be used for the protecting layer 154. The protecting layer 154 may be manufactured in transparent film format and cover all the surface of the display panel 153.

Further, differently from the illustration of FIG. 3, the display 150 may be implemented as electronic paper. The electronic paper is a display in which features of normal ink used in paper are applied, and has differences in using reflecting lights compared with related art flat displays. The electronic paper may change pictures or characters by using twist balls, or electrophoresis with capsules.

The display 150 may be implemented as a display apparatus which can be bent while having transparency. For example, when the substrate 151 is implemented as a polymer material such as plastics having transparent features, the driver 152 may be implemented as a transparent transistor, and the display panel 153 may be implemented as a transparent organic emitting diode and a transparent electrode, and the transparency may be kept. A transparent transistor may be a transistor which is manufactured by substituting non-transparent silicon of related art thin film transistors with transparent materials such as zinc oxide or titanium oxide. Further, new materials such as indium tin oxide (ITO) or graphene may be used for the transparent electrode. Graphene is the material which is plane-structured in a beehive format by connecting carbons, and has transparent features. Besides, the transparent organic emitting diode may be implemented with various materials.

According to the above, the display 150 may be implemented in various constitutions. The sensor 110 may be mounted on the edge or the lower portion of the display 150, and senses bending situations of the flexible display apparatus which includes the display 150. In the following, a method of sensing a bending situation in the sensor 110 will be specifically described.

Figure 4:
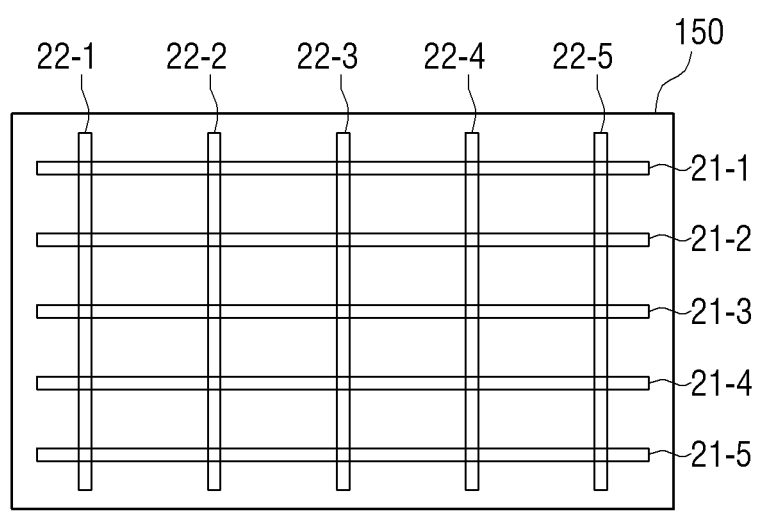
FIGS. 4 to 26 are diagrams which illustrate various exemplary embodiments of the structure of the display apparatus to sense bending situations in a flexible apparatus and sensing methods thereof.
Figure 5:
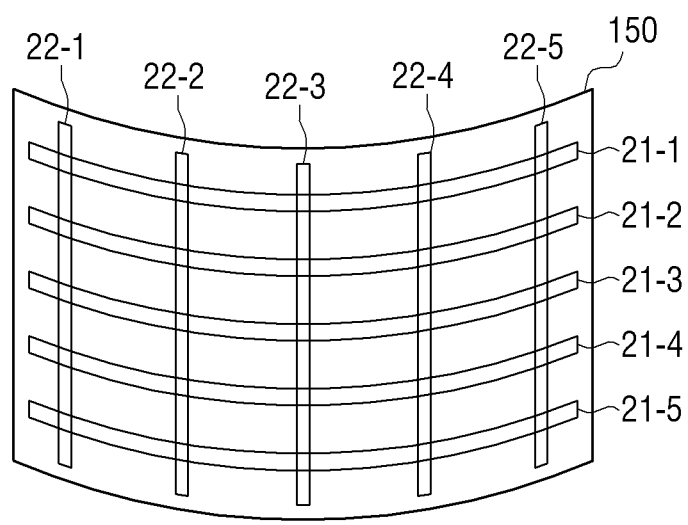
Figure 6:
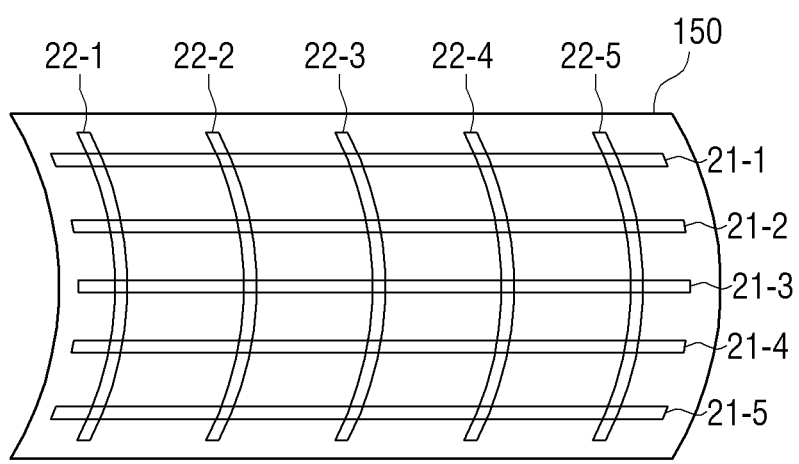

Various exemplary embodiments of method for sensing bending in the flexible display apparatus FIGS. 4 to 6 are diagrams which illustrate an example of a method which senses deformation in the flexible display apparatus, i.e., bending.

The flexible display apparatus 100 may be deformed in terms of shape by being bent with external pressure. The 'bending' may include normal bending, folding, rolling, and special bending. The 'normal bending' indicates the situation in which the flexible display apparatus is bent. Specifically, bending and flat, and bending and hold may be included in the normal bending.

The 'folding' indicates situation in which the flexible display apparatus is folded. Herein, folding and normal bending may be distinguished from each other according to degrees of bending. For example, when bending is made beyond a certain bending angle, the situation may be defined as folding. When bending is made within the certain bending angle, the situation may be defined as normal bending.

The 'rolling' is a situation in which the flexible display apparatus is rolled over. The rolling may be also determined based on bending angle. For example, rolling may be defined as situation in which bending beyond a certain bending angle is sensed over a certain area. Meanwhile, folding may be defined as a situation in which bending within a certain bending angle is sensed on a relatively small area.

Normal bending, folding and rolling described above may be determined based on curvature radius as well as bending angle.

Further, regardless of curvature radius, rolling may be defined as a situation in which the cross-sectional view of the rolled flexible display apparatus 100 is substantially circular or close to ellipse.

Further, the 'special bending' may indicate other various types of bending, such as, for example, twist, shaking, and swing. The special bending may be determined based on bending angle, the number of bending areas, distribution chart of bending areas, and curvature radius.

However, the above definitions regarding various types of deformations are merely one of the exemplary embodiments; and deformations may be defined differently according to types, sizes, weights, and features of the flexible display apparatus. For example, when the flexible display apparatus can be bent so that two surfaces contact each other, folding may be defined as a situation in which the surfaces of the device contact each other simultaneously while being bent. On the contrary, rolling may be defined as a situation in which a front face and a back face of the flexible display apparatus touch each other because of the bending.

For convenient explanation, the above various types of bending and other bending shape will be representatively referred to as 'bending' in general throughout the description.

The flexible display apparatus 100 may sense bending with various methods.

For example, the sensor 110 may include a bend sensor which is mounted on one surface such as the front face or the back face or on both faces. The controller 120 may sense bending by using values sensed in the bend sensor.

Herein, the bend sensor refers to a sensor which can be bent into itself and which has varying resistance values according to the degrees of bending. The bend sensor may be implemented to be various types such as optical fiber bending sensor, pressure sensor, or strain gauge.

The sensor 110 may sense resistance values by using an amount of voltage applied on the bend sensor or an amount of electrical current flowing through the bend sensor, and may sense a bending situation on the position of the corresponding bend sensor according to the resistance values.

Although FIG. 4 illustrates that the bend sensor is embedded in a front face of the display 150, this is merely exemplary. Accordingly, the bend sensor may be embedded in a back face of the display 150 or in both faces. Further, shape, number and arrangement position of the bend sensor may be changed variously. For example, one bend sensor or a plurality of bend sensors may be combined with the display 150. Herein, one bend sensor may sense one bending data. However, one bend sensor may have a plurality of sensing channels which sense a plurality of bending data.

FIG. 4 illustrates that a plurality of bend sensors in bar format are arranged horizontally and vertically, constructing a lattice-like structure.

Referring to FIG. 4, the bend sensor includes bend sensors 21-1 to 21-5 which are arranged toward a first direction and bend sensors 22-1 to 22-5 which are arranged toward a second direction orthogonal to the first direction. Each bend sensor may be arranged at certain interval.

Although FIG. 4 illustrates that 5 bend sensors 21-1 to 21-5, 22-1 to 22-5 arranged respectively in a horizontal direction and a vertical direction, this is merely exemplary. The number of bend sensors may be changed according to size of the flexible display apparatus. Accordingly, the reason that the bend sensors are arranged horizontally and vertically is to sense bending made on all areas of the flexible display apparatus. When a device has flexibility on a part of the area of the flexible display apparatus, or has the necessity to only sense bending performed on certain part of the area, bend sensors may be selectively arranged on corresponding parts.

Each of the bend sensors 21-1 to 21-5, 22-1 to 22-5 may be implemented as an electrical resistive sensor which uses electrical resistance, or a micro optical fiber sensor which uses the deformation rate of optical fibers. For convenient explanation, the following description will assume that the bend sensors are implemented as an electrical resistive sensor.

Specifically, as shown in the FIG. 5, when the flexible display apparatus 100 is bent so that the center area positioned on the center based on both left and right boundaries in the flexible display apparatus 100 can be directed downward, tension caused by bending is given to the bend sensors 21-1 to 21-5 which are arranged horizontally. Accordingly, resistance values of the bend sensors 21-1 to 21-5 which are arranged horizontally may be different from each other. The sensor 110 may sense that bending is made horizontally based on the center of the display surface by sensing changes in output values outputted from each of the bend sensors 21-1 to 21-5. Although FIG. 5 illustrates a bending situation in which the center area is directed to a lower orthogonal direction based on the display surface (−Z direction to be used in the discussion below), bending may be sensed based on changes in output values of the horizontal bend sensors 21-1 to 21-5 when bending is made toward an upper orthogonal direction based on the display surface (+Z direction to be used in the below).

Further, referring to FIG. 6, when the flexible display apparatus 100 is bent so that center area positioned on the center based on upper and lower boundaries is directed upward, tension is given to the bend sensors 22-1 to 22-5 which are arranged vertically. The sensor 110 may sense a vertical deformation based on output values of the bend sensors 22-1 to 22-5 which are arranged vertically. Although FIG. 6 illustrates bending toward +Z direction, bending toward −Z direction may be sensed by using the bend sensors 22-1 to 22-5 which are arranged vertically.

When deformation is made in a diagonal direction, tension is given to all of the horizontal and vertical bend sensors. Therefore, deformation toward a diagonal direction may be sensed based on output values of the horizontal and vertical bend sensors.

In the following, a specific method for sensing deformations such as normal bending, folding and rolling by using the bend sensors will be described.

Figure 7:
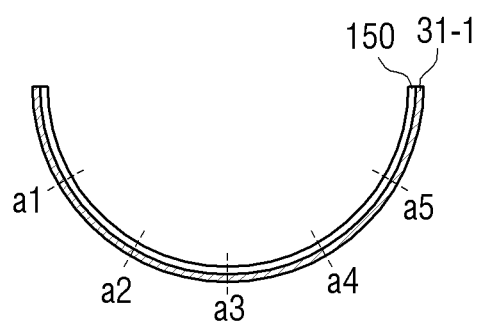
Figure 8:
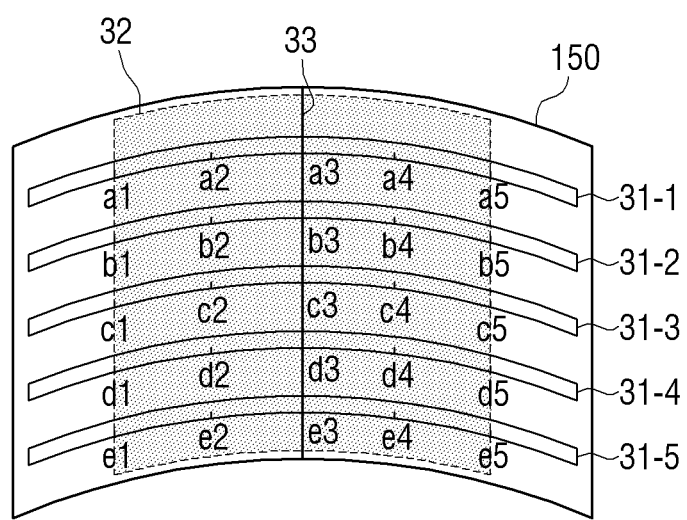
Figure 9:
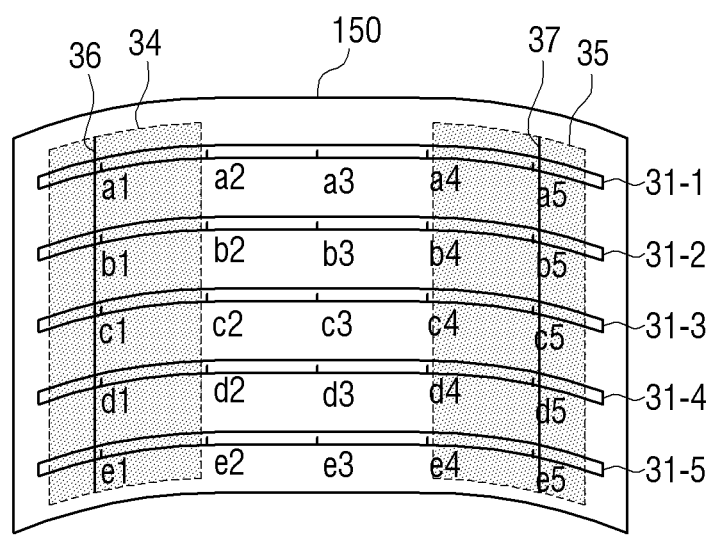

FIGS. 7 to 9 are diagrams which illustrate a method for sensing bending in the flexible display apparatus by using the bend sensors according to an exemplary embodiment.

FIG. 7 illustrates a cross-sectional view of the flexible display apparatus 100 when the flexible display apparatus is bent.

When the flexible display apparatus 100 is bent, the bend sensors, which are arranged on one side or both sides of the flexible display apparatus, are bent along with the flexible display apparatus and have resistance values corresponding to the intensity of a given tension, and output corresponding output values.

For example, when the flexible display apparatus 100 is bent as illustrated in FIG. 7, a bend sensor 31-1 arranged on the back face of the flexible display apparatus 100 is also bent, and outputs resistance values according to the intensity of a given tension caused by bending.

In this case, the intensity of the tension increases proportionally to the degree of bending. For example, when bending is made in FIG. 7, the degree of bending is maximum at the center area. Thus, the maximum tension is given to the bend sensor 31-1 which is arranged on the center area (i.e., a3 point), and the bend sensor 31-1 has the maximum resistance values. On the contrary, the degree of bending weakens toward an external direction. Therefore, the bend sensor 31-1 has smaller resistance values towards the a2 and a1 points, or the a4 and a5 points, rather than the a3 point.

When the resistance values outputted from the bend sensor have a maximum value at a specific point and decreases towards both end directions, the sensor 110 may determine that the area where the maximum resistance value is detected to be area where the greatest bending is made. Further, the sensor 110 may determine the area where the resistance values are not changed to be a flat area where bending is not made, and determine the area where the resistance values are changed beyond a predetermined value to be a bending area where bending is somewhat made.

FIGS. 8 and 9 are diagrams which illustrate a method for defining the bending area according to an exemplary embodiment. Referring to FIGS. 8 and 9, because these are provided to explain that the flexible display apparatus is bent toward a horizontal direction based on the front face, the bend sensors arranged vertically are not illustrated for convenient explanation. Further, for another convenient explanation, drawing reference numerals of the bend sensors are differently provided respectively according to the drawings; however, the bend sensors illustrated in FIG. 4 are substantially utilized as they are.

The 'bending area' is where the flexible display apparatus is curved and bent. Because the bend sensors are bent together by bending, the bending area may be defined as an area of all the points where the bend sensors outputting different resistance values are arranged.

The sensor 110 may sense the size of the bending lines, the direction of the bending lines, the position of the bending lines, the number of bending lines, the number of bending, the bending velocity which the shape changes, the size of the bending area, the position of the bending area, and the number of bending areas based on relations between points with changed resistance values.

Specifically, when a distance between points with changed resistance values is within a predetermined value, each of the points outputting resistance values is detected as one bending area. When there are points with changed resistance values, which are distanced beyond a predetermined distance, the area may be divided and defined as different bending areas to each other based on these points. FIGS. 8 and 9 will be referred for further explanation.

FIG. 8 is a diagram which illustrates a method for sensing one bending area. Referring to FIG. 8, when the flexible display apparatus 100 is bent, the a1 point to the a5 point of the bend sensor 31-1, the b1 point to the b5 point of bend sensor 31-2, the c1 point to the c5 point of a bend sensor 31-3, the d1 point to the d5 point of a bend sensor 31-4, and the e1 point to the e5 point of a bend sensor 31-5 have different resistance values from the original state.

In this case, points with changed resistance values in the bend sensors 31-1 to 31-5 are positioned within a predetermined distance and consecutively arranged.

Therefore, the sensor 110 senses area 32 including all of the a1point to the a5 point of the bend sensor 31-1, the b1 point to the b5 point of the bend sensor 31-2, the c1 point to the c5 point of the bend sensor 31-3, the d1point to the d5 point of the bend sensor 31-4, and the e1 point to the e5 point of the bend sensor 31-5 as one bending area.

FIG. 9 is a diagram which illustrates a method for sensing a plurality of bending areas.

Referring to FIG. 9, according to the bending of the flexible display apparatus, the a1point to the a5 point of the bend sensor 31-1, the b1 point to the b5 point of the bend sensor 31-2, the c1 point to the c5 point of the bend sensor 31-3, the d1 point to the d5 point of the bend sensor 31-4, and the e1 point to the e5 point of the bend sensor 31-5 have different resistance values from the original state.

On the bend sensor 31-1, the a1 point to the a2 point and the a4 point to the a5 point are respectively continued based on each point. However, the a2 point to the a4 point is not continued because there is an a3 point between the a2 point and the a4 point. Therefore, when it is considered that the a2 point to the a4 point are displaced for a predetermined distance, an area between the a1 point and the a2 point, and an area between the a4 point and the a5 point may be determined to be different bending areas from each other. Further, points of the other bend sensors 31-1 to 31-5 may be divided likewise.

Therefore, the flexible display apparatus 100 may define area 34 including all of the a1 point to the a2 point of the bend sensor 31-1, the b1 point to the b2 point of the bend sensor 31-2, the c1 point to the c2 point of the bend sensor 31-3, the d1 point to the d2 point of the bend sensor 31-4, and the e1 point to the e2 point of the bend sensor 31-5 as one bending area, and area 35 including all of the a4 point to the a5 point of the bend sensor 31-1, the b4 point to the b5 point of the bend sensor 31-2, the c4 point to the c5 point of the bend sensor 31-3, the d4 point to the d5 point of the bend sensor 31-4, and the e4 point to the e5 point of the bend sensor 31-5 as another bending area.

The bending area may include bending lines. The 'bending lines' may be defined as lines connecting points with the maximum detected resistance values in each bending area.

For example, referring to FIG. 8, line 33 may be defined as a bending line, which connects the a3 point outputting the maximum resistance value in the bending area 33, the b3 point outputting the maximum resistance value in the bend sensor 31-2, the c3 point outputting the maximum resistance value in the bend sensor 31-3, the d3 point outputting the maximum resistance value in the bend sensor 31-4, and the e3 point outputting the maximum resistance value in the bend sensor 31-5. FIG. 8 illustrates that one bending line is formed vertically on the center area of the display surface.

Further, referring to FIG. 9, line 36 may be defined as a bending line, which connects the a1 point outputting the maximum resistance value in the bending area 34, the b1 point outputting the maximum resistance value in the bend sensor 31-2, the c1 point outputting the maximum resistance value in the bend sensor 31-3, the d1 point outputting the maximum resistance value in the bend sensor 31-4, and the e1 point outputting the maximum resistance value in the bend sensor 31-5. Further, line 37 may be defined as a bending line, which connects the a5 point outputting the maximum resistance value in the bending area 35, b5 point outputting the maximum resistance value in the bend sensor 31-2, the c5 point outputting the maximum resistance value in the bend sensor 31-3, the d5 point outputting the maximum resistance value in the bend sensor 31-4, and the e5 point outputting the maximum resistance value in the bend sensor 31-5. Thus, FIG. 9 illustrates that two vertical bending lines may be formed near to the left and right boundaries on the display surface.

Figure 10:
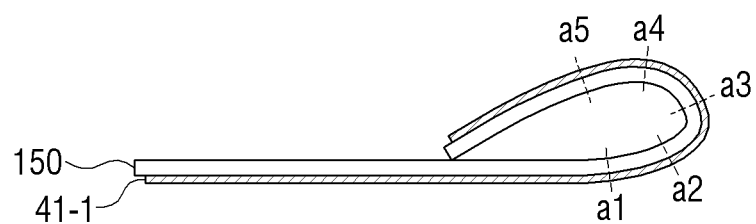
Figure 11:
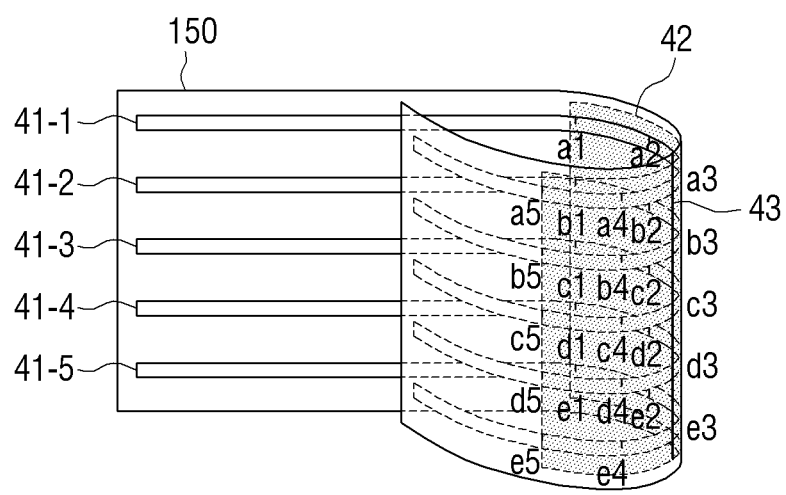

FIGS. 10 and 11 are diagrams which illustrate an example of a method for sensing a situation that the flexible display apparatus is folded.

FIG. 10 is a cross-sectional view of an example when the flexible display apparatus 100 is folded.

When the flexible display apparatus is folded, the bend sensors, which are arranged on one side or both sides of the flexible display apparatus, are folded together and have resistance value corresponding to intensity of given tension.

For example, when the right boundary area of the flexible display apparatus 100 is folded to direct a tension toward the center in FIG. 10, a bend sensor 41-1 arranged on the back face of the flexible display apparatus 100 is also folded and outputs resistance values according to the intensity of a given tension.

Likewise in bending, the a3 point where the intensity of tension given to the bend sensor 41-1 is the greatest, has the maximum resistance value and a smaller resistance value towards both end directions. In other words, the bend sensor 41-1 has a smaller resistance value at points a1 and a2, or points or a4 and a5, than the resistance value of point a3.

When folding is made so that the flexible display apparatus is bent beyond a certain bending angle, resistance values of the points corresponding to the bending lines are sensed to be more than a certain resistance value. Therefore, the controller 120 may determine folding or normal bending according to the resistance values.

Further, when bending is possible so that the surfaces of the flexible display apparatus 100 can contact each other, the controller 120 may determine folding by considering whether the surfaces contact each other. Referring to FIG. 10, when the right boundary area of the flexible display apparatus 100 is bent toward the Z+ direction and folded on the front face, displaced areas contact each other on the front face of the flexible display apparatus 100. In this case, touch may be sensed on one area of the display surface, and changes in resistance values become bigger compared to normal bending. Therefore, the controller 120 may calculate the distance from the boundary side where bending is made to a bending line, and may determine that folding is performed when touch is sensed on the point at the distance which is calculated toward the contrary direction based on the bending line.

FIG. 11 is a diagram which illustrates a method for determining the folding area according to an exemplary embodiment. Referring to FIG. 11, because it is provided to explain that the flexible display apparatus is folded horizontally based on the front face, the bend sensors arranged toward a vertical direction are not illustrated for convenient explanation.

Because the folding area is formed as the flexible display apparatus is folded, likewise in bending, the folding area may be defined as more than one or two areas including all of the points on the bend sensor outputting different resistance values from the original state according to bending of the bend sensors. The method for defining and dividing the folding area is the same as in bending area, which will not be explained within an overlapping scope.

Referring to FIG. 11, area 42 may be defined as a folding area, which includes all of the points having output resistance values different from the original state, i.e., points including the a1 point to the a5 point of the bend sensor 41-1, the b1 point to the b5 point of a bend sensor 41-2, the c1 point to the c5 point of a bend sensor 41-3, the d1 point to the d5 point of a bend sensor 41-4, and the e1 point to the e5 point of a bend sensor 41-5.

The folding area may be divided into two areas based on a folding line. The folding line may indicate a line connecting points which output the maximum resistance values in each folding area. The folding line may be used in the same context as the bending line.

Referring to FIG. 11, the line 43 may be the folding line, which connects the a3 point which outputs the maximum resistance value in the bend sensor 41-1, the b3 point which outputs the maximum resistance value in the bend sensor 41-2, the c3 point which outputs the maximum resistance value in the bend sensor 41-3, the d3 point which outputs the maximum resistance value in the bend sensor 41-4, and the e3 point which outputs the maximum resistance value in the bend sensor 41-5.

When folding is sensed, the controller 120 may perform different operations than those in normal bending. For example, operations such as displaying different contents screens to each other may be performed regarding each folding area.

As described above, the flexible display apparatus 100 may be rolled like a paper sheet. The controller 120 may determine that rolling is performed by using results sensed in the sensor 110.

Figure 12:
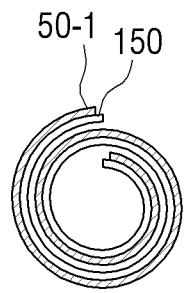
Figure 13:
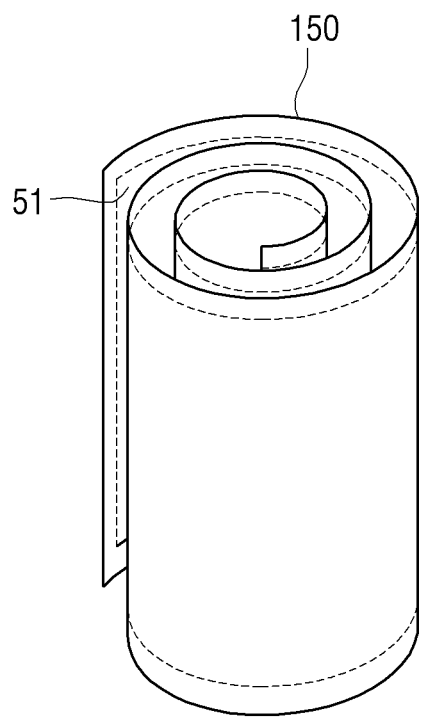
Figure 14:
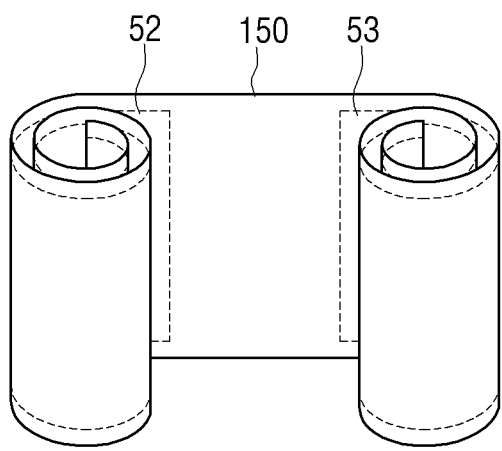

FIGS. 12 to 14 are diagrams which illustrate a method for sensing rolling in the flexible display apparatus.

FIG. 12 illustrates a cross-sectional view of an example when the flexible display apparatus 100 is rolled.

Likewise in the above, when the flexible display apparatus 100 is rolled, tension is given to the bend sensors which are arranged on one side or both sides of the flexible display apparatus.

In this case, intensity of the tension given to the bend sensors may be considered to be similar with each other in a certain range, resistance values outputted from the bend sensors may be also approximated to each other within a certain range.

In order to perform rolling, bending should be made beyond a certain curvature. Further, when rolling is performed, the bending area is formed more largely compared with normal bending or folding. Therefore, the controller 120 may determine the rolling situation when sensing that bending is made beyond a certain bending degree consecutively on an area having more than a certain size.

Further, in the rolling situation, the front face and the back face of the flexible display apparatus contact each other. For example, referring to FIG. 12, when one boundary of the display 150 is bent toward the +Z direction and rolled toward the inner side of the display surface, the display surface, i.e., the front face and the back face which a bend sensor 50-1 is arranged contact each other.

Therefore, in another exemplary embodiment, the controller 120 may determine the rolling situation according to whether the front face and the back face of the flexible display apparatus contact each other. In this case, the sensor 110 may include a touch sensor. The controller 120 may determine that the flexible display apparatus is rolled when resistance values outputted from the bend sensor are approximated and when the touch sensors which are arranged on the front face and the back face of the flexible display apparatus sense contacts respectively. Further, the controller 120 may determine whether parts of the area in the flexible display apparatus contact or approach each other by curving the flexible display apparatus with a magnetic sensor, a geomagnetic sensor, an optical sensor, or a near field sensor instead of the touch sensor.

FIGS. 13 and 14 are diagrams which illustrate a method for defining the rolling area according to an exemplary embodiment.

The 'rolling area' indicates all of the areas where the flexible display apparatus is bent and rolled. The 'rolling area' may be defined as more than one or two areas including all of points on the bend sensors which output different resistance values from the original state like in normal bending and folding. The method for defining and dividing the rolling area is the same as that used in defining the bending area and the folding area, which will not be described within an overlapping scope.

Referring to FIG. 13, when the flexible display apparatus 100 is rolled overall, the whole area 51 of the flexible display apparatus may be defined as the rolling area. Referring to FIG. 14, when the flexible display apparatus 100 is rolled in parts, and when points which output different resistance values from the original state are at a predetermined distance, partial areas 52, 53 of the flexible display apparatus may be defined as different rolling areas to each other.

Therefore, the flexible display apparatus 100 may be bent in various shapes, and the controller 120 may sense the bending shape based on sensed results of the sensor 110. Further, the controller may detect how much bending is made based on the sensed results, i.e., bending angle.

Figure 15:
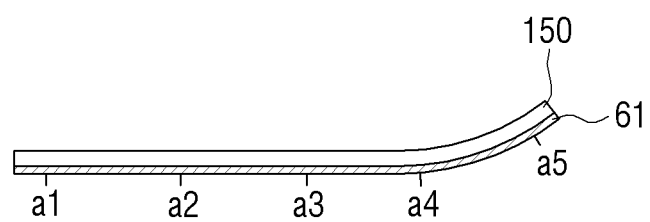
Figure 16:
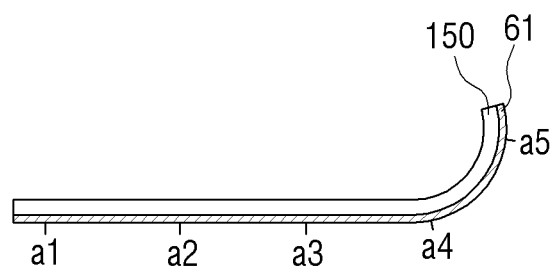

FIGS. 15 and 16 are diagrams which illustrate a method for determining a bending degree.

Referring to FIGS. 15 and 16, the flexible display apparatus 100 determines a bending degree of the flexible display apparatus by using changes in resistance values outputted at intervals from the bend sensors.

Specifically, the controller 120 calculates a difference between a resistance value of a point which outputs the maximum resistance value and a resistance value of a point which is at a certain distance from the point outputting the maximum resistance value.

The controller 120 may determine the bending degree by using the calculated difference of the resistance values. Specifically, the flexible display apparatus 100 may divide the bending degree into a plurality of levels, and match each level with a resistance value having a certain range and store the matched results.

Therefore, the flexible display apparatus may determine the bending degree of the flexible display apparatus in each level among the plurality of levels in which the calculated differences are divided according to the bending degree.

For example, referring to FIGS. 15 and 16, the bending degree may be detected based on differences in resistance values outputted from the a5 point which outputs the maximum resistance value on a bend sensor 61 arranged on the back face of the flexible display apparatus 100 and from the a4 point which are at a certain distance apart from each other.

Specifically, among the plurality of prestored levels in FIGS. 15 and 16, a level to which the calculated difference in resistance values belongs is determined, and the bending degree corresponding to the matching level may be determined. The bending degree may be also expressed as a bending angle or a bending strength.

Because the bending degree in the exemplary embodiment of FIG. 16 is greater than in the exemplary embodiment of FIG. 15, the difference in resistance values outputted from the a5 point and the a4 point of the bend sensor in FIG. 16 becomes greater than that in resistance values outputted from the a5 point and the a4 point of the bend sensor in FIG. 15. Therefore, the controller 120 may determine that the bending degree of FIG. 16 is greater than that of FIG. 15 when bending is made in FIG. 16.

The controller 120 may perform proper operations according to the bending degree. For example, when channel zapping is performed and when bending degree is greater, the velocity of channel zapping may be faster and the range of channel zapping may be larger. On the contrary, when the bending degree is lower, channel zapping may be performed more slowly and within less numbers of channels. Operations may be also differently performed according to the bending degree when in controlling volume or converting contents.

As described above, bending direction of the flexible display apparatus 100 may be different such as in the Z+ direction or the Z− direction.

Figure 17:
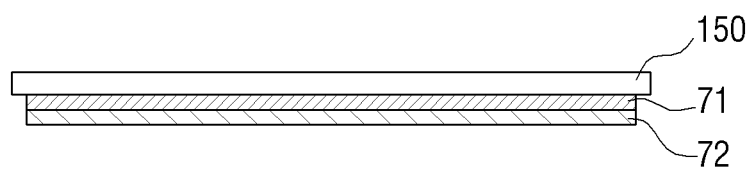
Figure 18:
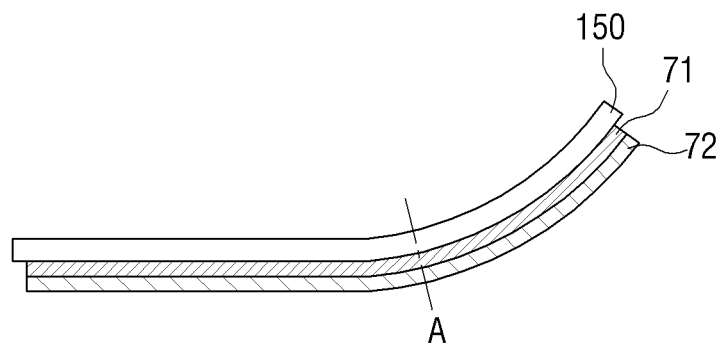
Figure 19:
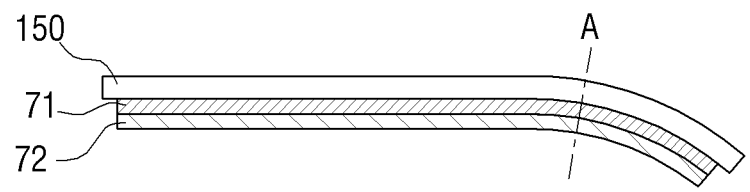

Bending direction may be sensed by various methods. For example, bending direction may be determined according to differences of changes in resistance values of the bend sensors respectively by overlapping and arranging two bend sensors. Referring to FIGS. 17 to 19, a method for sensing the bending direction by using the overlapped bend sensors will be described below.

For convenient explanation, it will be explained with the exemplary embodiment of normal bending in FIGS. 17 to 19. Same method may be applied in folding and rolling as well as bending.

Referring to FIG. 17, two bend sensors 71, 72 may be overlapped and included on one side of the display 150. In this case, when bending is made toward one direction, resistance values on a point where bending is made in the bend sensor 71 and the bend sensor 72 are detected differently. Therefore, when comparing resistance values on the same point of the two bend sensors 71, 72, bending direction may be detected.

Specifically, when the flexible display apparatus 100 is bent toward the Z+ direction in FIG. 18, on the "A" point corresponding to a bending line, a bigger intensity of tension is given to the lower bend sensor 72 rather than the upper bend sensor 71.

On the contrary, when the flexible display apparatus 100 is bent toward the back face in FIG. 19, bigger intensity of tension is given to the upper bend sensor 71 rather than the lower bend sensor 72.

Therefore, the controller 120 may detect a bending direction by comparing resistance values on point "A" in the two bend sensors 71, 72.

Although FIGS. 17 to 19 illustrate that the two bend sensors are overlapped with each other and arranged on one side of the display 150, the bend sensors may be arranged on both sides of the display 150.

Figure 20:
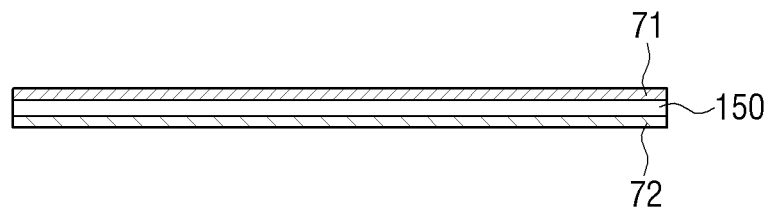

FIG. 20 illustrates that the two bend sensors 71, 72 are arranged on both sides of the display 150.

Therefore, when the flexible display apparatus 100 is bent toward a first direction orthogonal to the screen (Z+ direction in the below), the bend sensor arranged on a first side among the both sides of the display 150 is given by compression power while the bend sensor arranged on a second side is given by tension. Meanwhile, when the flexible display apparatus 100 is bent toward a second direction contrary to the first direction (the Z− direction in the discussion below), the bend sensor arranged on the second side is given by a compressive force while the bend sensor arranged on the first side is given by tension. Accordingly, values of the two bend sensors are detected differently according to the bending direction, and the controller 120 may divide the bending direction according to detected features of the values.

Although FIGS. 17 to 20 describe that the bending direction is detected by using the two bend sensors, the bending direction may be divided only with a strain gauge arranged on one side of the display. In other words, because the strain gauge arranged on one side is given by compression power or tensile force according to the bending direction, the bending direction may be detected when features of the output values are detected.

Figure 21:
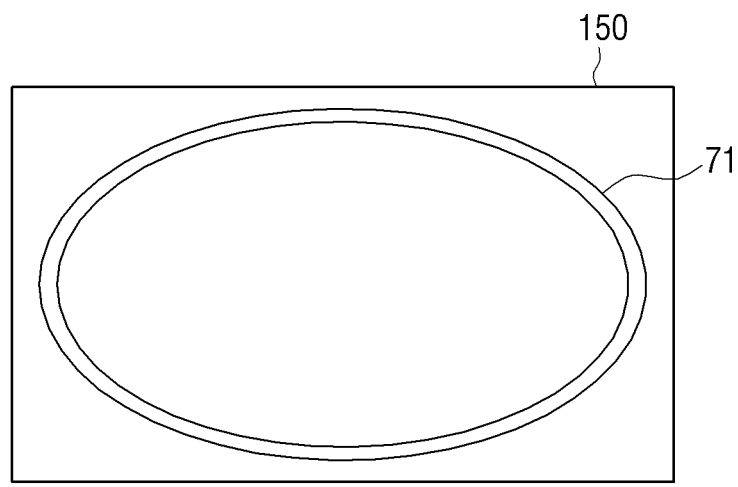

FIG. 21 illustrates an example of constitution which senses bending by arranging one bend sensor on one side of the display 150. Referring to FIG. 21, the bend sensor 71 is implemented to be a closed curve such as circle, rectangle, or other polygons, and arranged on the boundary area of the display 150. The controller 120 may determine points where changes in output values are detected on the closed curve as the bending area. Besides, the bend sensors may be combined with the display 110 in an open curve format such as S shape, Z shape, or other zigzag shape.

Figure 22:
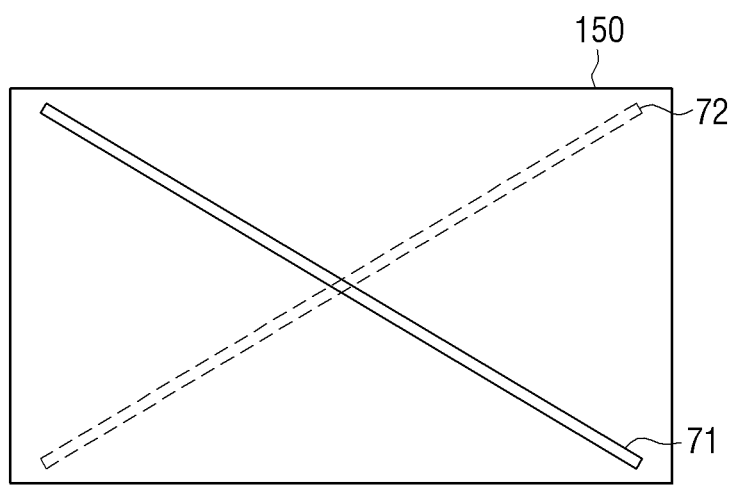

FIG. 22 illustrates an exemplary embodiment in which the two bend sensors are crossed and arranged with each other. Referring to FIG. 22, the first bend sensor 71 is arranged on the first side of the display 150 and the second bend sensor 72 is arranged on the second side of the display 150. The first bend sensor 71 is arranged toward a first diagonal direction on the first side of the display 150 and the second bend sensor 72 is arranged toward a second diagonal direction on the second side. According to various bending conditions such as when each edge area is bent, when each boundary area is bent, when a center is bent, and when folding or rolling is performed, output values and output points in the first and second bend sensors 71, 72 become different. Thus, the controller 120 may determine which type of bending is made according to features of output values.

Although the above various exemplary embodiments describe that the bend sensors in line shape are used, bending may be sensed by using a plurality of fragmentary strain gauges.

Figure 23:
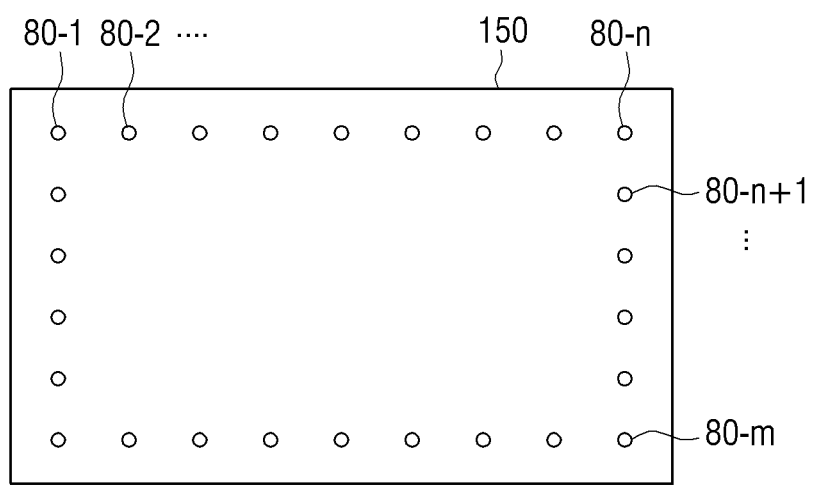
Figure 24:
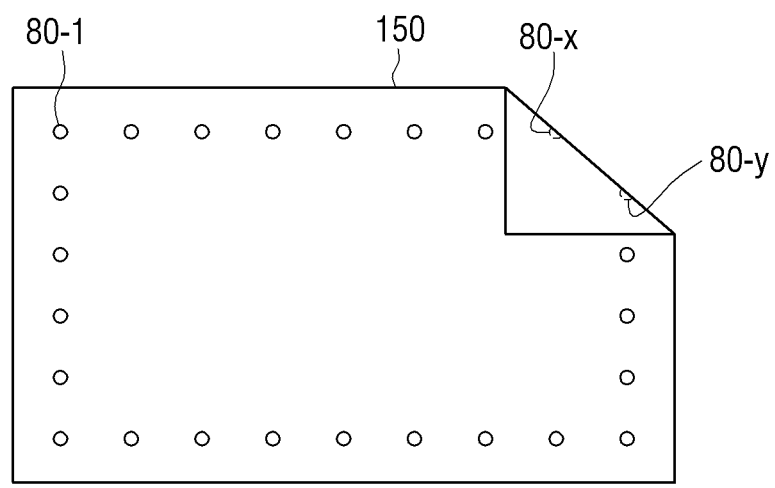

FIGS. 23 to 24 illustrate an exemplary embodiment which senses bending by using a plurality of strain gauges. The strain gauges sense deformations of the surface regarding measured objects according to changes in resistance values by using metal or semiconductor which resistance changes greatly by intensity of given power. Normally, materials such as metal have a property that resistance values increase when the length increases according to an external power and decrease when the length decreases. Therefore, when changes in resistance values are sensed, it is determined when bending is made.

Referring to FIG. 23, a plurality of the strain gauges are arranged on the boundary area of the display 150. The number of the strain gauges may be different according to size, shape or preset bending sensing resolution regarding the display 150.

While the strain gauges are arranged in FIG. 23, a user may bend voluntary points toward a voluntary direction. Specifically, when one edge area is bent as in FIG. 24, a strain gauge 80-$x$ overlapped with a bending line among strain gauges 80-1~80-$n$ which are arranged horizontally is given by power. Therefore, an output value of corresponding strain gauge 80-$x$ is greater than output values of the other strain gauges. Further, a strain gauge 80-$y$ overlapped with a bending line is given by power among strain gauges 80-$n$, 80-$n$+1, . . . , 80-$m$ which are arranged vertically, and an output value of the strain gauge 80-$y$ is changed. The controller 120 may determine a line connecting the two strain gauges 80-$x$, 80-$y$ of which output values are changed as bending line.

Further, differently from descriptions of FIGS. 18 to 24, the flexible display apparatus 100 may sense bending direction by using various sensors such as a gyro sensor, a geomagnetic sensor, and an acceleration sensor.

Figure 25:
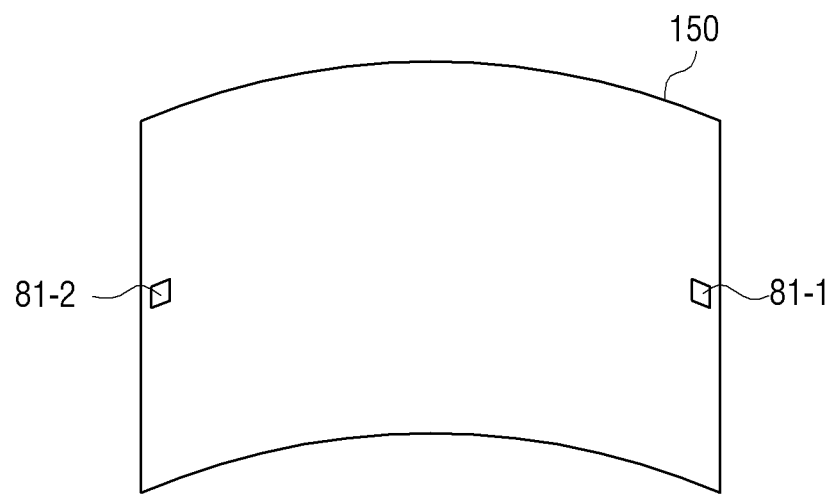
Figure 26:
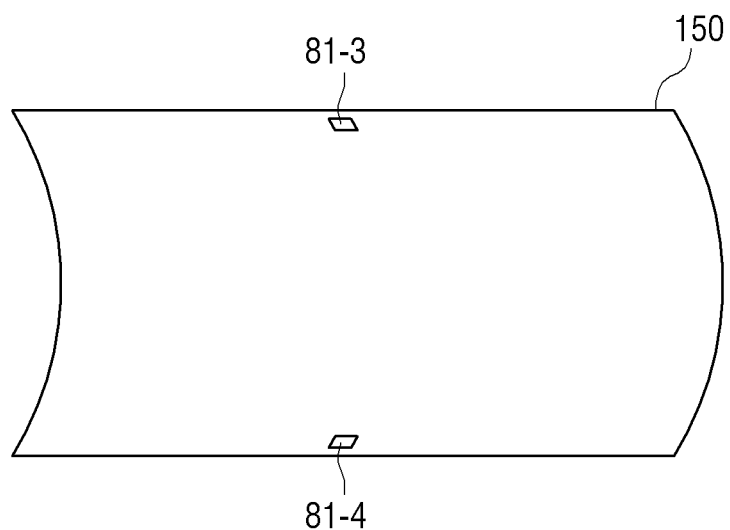

FIGS. 25 and 26 are diagrams which illustrate a method for sensing a bending direction by using the acceleration sensor according to an exemplary embodiment of the sensors. Referring to FIGS. 25 and 26, the flexible display apparatus 100 includes a plurality of acceleration sensors 81-1, 81-2.

The acceleration sensors 81-1, 81-2 are sensors which measure acceleration and direction of acceleration when movement occurs. Specifically, the acceleration sensors 81-1, 81-2 output sensing values corresponding to gravity acceleration which changes according to gradient of a device that the sensors are mounted. Therefore, when the acceleration sensors 81-1, 81-2 are arranged respectively on both boundary areas of the flexible display apparatus, output values sensed in the acceleration sensors 81-1, 81-2 respectively are changed when the flexible display apparatus is bent. The controller 120 calculates pitch angle and roll angle by using output values sensed in the acceleration sensors 81-1, 81-2. Thus, bending direction may be determined based on changes in pitch angles and roll angles sensed by the acceleration sensors 81-1, 81-2.

Although FIG. 25 illustrates that the acceleration sensors 81-1, 81-2 are arranged on both boundaries horizontally based on the front face of the flexible display apparatus 100, they may be arranged vertically in FIG. 26. In this case, when the flexible display apparatus 100 is bent toward a vertical direction, the bending direction may be sensed according to measured values sensed in acceleration sensors 81-3, 81-4 arranged vertically.

Although FIGS. 25 and 26 illustrate that the acceleration sensors are arranged on left and right boundaries or up and down boundaries of the flexible display apparatus 100, the acceleration sensors may be arranged on all of left, right, up and down boundaries, or edge areas.

As described above, the gyro sensor or the geomagnetic sensor may be utilized to sense bending direction other than the acceleration sensor. The gyro sensor is a sensor which detects angular velocity by measuring Coriolis power given to the velocity direction when rotating movement occurs. Bending direction may be sensed because which direction it rotates can be detected according to measured values of the gyro sensor. The geomagnetic sensor is a sensor which senses azimuth by using a two-axis fluxgate or a three-axis fluxgate. When implemented to be with the geomagnetic sensors, the geomagnetic sensors which are arranged on boundaries of the flexible display apparatus 100 respectively move their position when the boundaries are bent, and output electrical signals corresponding to changes in geomagnetics thereof. The controller 120 may calculate yaw angle by using output values from the geomagnetic sensors. Therefore, according to changes in the calculated yaw angles, various bending features such as bending area and bending direction may be determined.

In summary, the flexible display apparatus 100 may sense bending by using various types of sensors. The above constitutions of the sensors and the sense methods may be applied to the flexible display apparatus 100 in separation or in combination.

The sensor 110 may sense user manipulations to touch the screen of the display 150 as well as bending.

For example, the sensor 110 may include transparent conductive film such as ITO which is evaporated on the substrate 151 within the display 150 and film formed on the upper portion of the transparent conductive film. Therefore, when a user touches the screen, electrical signals are transmitted to the controller 120 by contacting the upper and lower substrates on the touched point. The controller 120 recognizes the touched point by using coordinates of the electrode where the electrical signals are transmitted. Touch sense methods are disclosed in various previous literatures, which will not be further described in this specification.

When the controller 120 senses touching or bending, various controlling operations may be performed according to the touching or the bending. Thus, the flexible display apparatus 100 may sense various types of bending. When every bending is totally used, a user has difficulty in remembering all types of bending. Therefore, the controller 120 controls the graphic processor 130 and the display 150 to overlap and display bending interaction guide with objects so that a user can intuitively recognize each bending shape or bending method. Following will explain various examples of screens including objects where a bending interaction guide is added.

Figure 27:
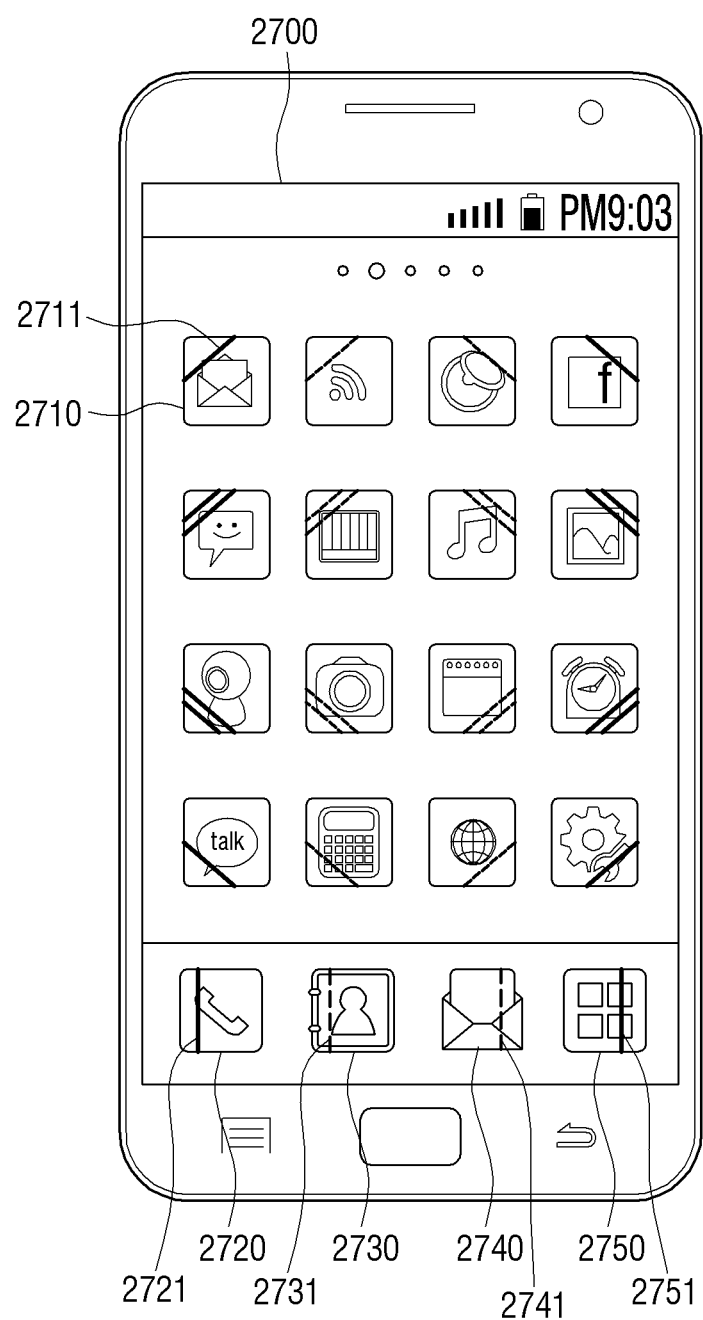
FIG. 27 illustrates an example of screen displayed on the flexible display apparatus of FIG. 2.

Various examples regarding screens including bending interaction guide and regarding bending interaction guide FIG. 27 illustrates an example of a main screen which respective application icons and menus are displayed. Referring to FIG. 27, main screen 2700 is divided into an icon display area where pages are converted by user manipulation and a menu display area where a default menu is fixedly displayed on the lower portion of the icon display area.

On the icon display area, an object 2710 and bending interaction guide 2711 added with the object are displayed. Although objects 2710 are arranged in 4×4 matrix form within the icon display area, the arrangement of the objects may be variously implemented in n×m form. For example, they may be arranged in various forms such as 3×3, 3×4, 3×5, 4×3, 4×4, 4×5, 5×3, 5×4 and 5×5. Further, although FIG. 27 illustrates an example of a creating screen when the flexible display apparatus 100 is implemented as a cellular phone, the arrangement form of the objects may be also varied according to the screen ratio when the flexible display apparatus is implemented as a display apparatus having a screen ratio of which the length and the width are different from each other such as a tablet PC.

The bending interaction guide 2711 may be created in different shapes from each other according to bending features corresponding to each object. Referring to FIG. 27, drawing reference numerals, 2710 and 2711, are added regarding the object on the left upper position and the bending interaction guide; however, this is merely provided for convenient illustration. All the other objects may be displayed by being added with the bending interaction guide.

The objects 2710 include application icons to implement respective applications, folder icons to open previously created folders, and function icons to implement respective functions which the flexible display apparatus 100 provide. Certain shapes of bending are set respectively regarding these icons. The bending interaction guide is matched with each object according to the set bending features.

The bending interaction guide may be expressed as a line image guide which is displayed differently according to positions and shapes of bending lines, or which line images are displayed by adding at least one character guide and symbol guide. For example, regarding bending which bends and spreads the left upper edge, a bending line is formed diagonally on the left upper edge part. Therefore, with regard to an object in which a corresponding bending is set, the line guide image expressed in diagonal shape is added on the left upper edge part. When a user manipulates bending which bends and spreads the upper left edge according to the guide, a corresponding object is selected and a corresponding operation for the object is performed.

On the menu display area within the main screen 2700, respective menus 2720, 2730, 2740, 2750 which are frequently used are displayed. Bending interaction guides 2721, 2731, 2741, 2751 are added and displayed with each of the menus 2720, 2730, 2740, 2750.

The bending interaction guide may be displayed on various screens other than the main screen of FIG. 27. Thus, the flexible display apparatus 100 may display an implementing screen by implementing respective prestored applications and mark the bending interaction guide on the implementing screen.

Figure 28:
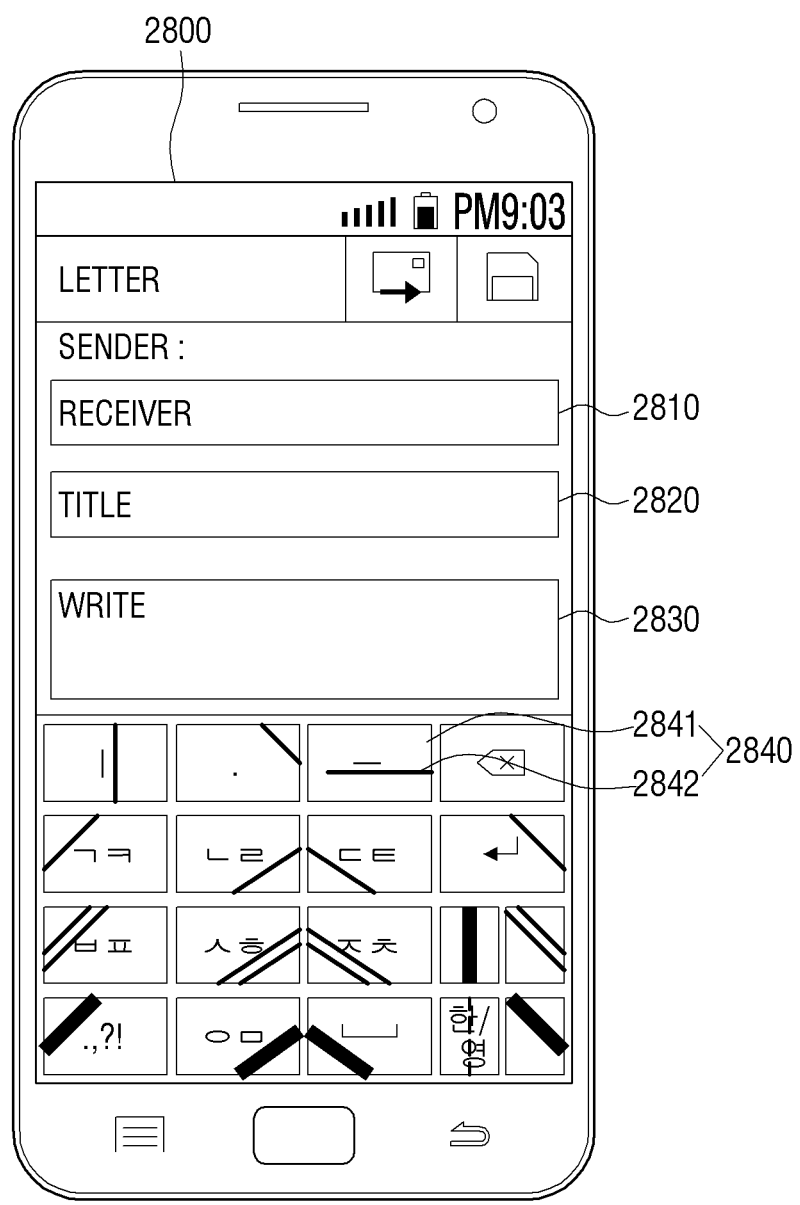
FIG. 28 illustrates another example of screen displayed on the flexible display apparatus of FIG. 2.

FIG. 28 illustrates an example of a screen constitution which is displayed when implementing the message send function according to an exemplary embodiment.

Referring to FIG. 28, message send screen 2800 includes respective input areas 2810, 2820, 2830 to input characters or symbols and select button area 2840 to input characters or symbols displayed on the input areas.

The input areas 2810, 2820, and 2830 may mount areas to display a receiver, a title and a letter.

The select button area 2840 displays respective select buttons 2841 to input characters or symbols. Bending interaction guide 2842 is added and displayed on each select button 2841.

The controller 120 displays characters or symbols corresponding to the select button on the input area when bending corresponding to the bending interaction guide 2842 displayed on each select button 2841 is sensed. For example, when bending is inputted according to the bending interaction guide displayed on the select button area 2840 after selecting the first input area 2810 to input a receiver, the controller 120 displays characters or symbols corresponding to the bending on the first input area 2810. Next, when bending is inputted again after selecting the second or third input area 2820, 2830, the controller 120 displays characters or symbols corresponding to the bending on the second or the third input area 2820, 2830.

Although FIGS. 27 and 28 illustrate examples in which the bending interaction guide is added with each object, the bending interaction guide may be displayed on a position in which a bending line will be formed within one screen. For example, while displaying electronic book contents on the screen by implementing the electronic book application, the bending interaction guide regarding at least one of a bending set with respect to a corresponding application may be added and displayed on the screen. In other words, when it is set that the operation of turning a first page to a next page is performed by bending the right boundary, the bending interaction guide in line shape may be displayed on the right boundary. Further, when it is set that the operation of implementing the bookmark function to remember a corresponding page is performed by bending the right edge, the bending interaction guide in line shape may be displayed on the right edge.

Besides, when the keyboard application is used, the bending interaction guide may be displayed on positions of keys displayed on the screen. Further, when a web page is displayed by implementing the web browser program, or when the implementing screen is displayed by implementing another application, the bending interaction guide corresponding to the bending set with respect to the program may be displayed. Further, on every position in which scrawls or extra input objects are defined, the bending interaction guide may be displayed and used.

The bending interaction guide may be set uniquely per each object or uniquely per marking position on the screen. Operation system or software platform of the flexible apparatus 100 may uniquely map the bending interaction guide uniquely with the object or automatically with the position on the screen. Regarding mapping with the position, when the object moves, the bending and the bending interaction guide corresponding to the moved position may be mapped with corresponding object.

Further, the bending and the bending interaction guide may be mapped according to a request of applications. In other words, when an application manufacturer considers optimized bending for usage of a corresponding application, information regarding the bending and information regarding the bending interaction guide which expresses a shape or a method of the bending may be included within driving information of the application. Operation system or software platform of the flexible apparatus 100 sets the bending and the bending interaction guide regarding the corresponding application icon by using bending information and bending interaction guide information which are stored within driving information of the application. At least one of such bending information and bending interaction guide information may be defined in standard format. In other words, a standard may be established with respect to which area within the application information the bending and the bending interaction guide may be installed, or how many bytes of codes such information may be expressed. Therefore, an application manufacturer may manufacture the bending and the bending interaction guide uniquely, based on the features that the manufacturer wants to implement in the flexible apparatus.

Thus, new bending formats and new bending interaction guides may be provided as well as basic bending and the guide thereof in the flexible apparatus 100.

Further, a user may map another bending regarding a specific object. For example, when pushing a set button, what is displayed may include UI screen where the user can select a type of bending that can be sensed and objects could be mapped with the bending in the flexible apparatus 100. A user can map the bending with an object through the UI screen.

While mapping the bending with an object, the order of priority may be necessary. When the flexible apparatus 100 is designed to set bending per position, and when bending requested by a user or an application is different from bending on position where corresponding object is displayed, prior bending may be mapped with a corresponding object by comparing the order of priority between two bendings. Order of priority may be defined so that a bending requested by a user has a first order of priority, a bending requested by an application has a next order of priority, and a bending set with respect to the position has a last order of priority. Such order of priority may be set variously.

Figure 29:
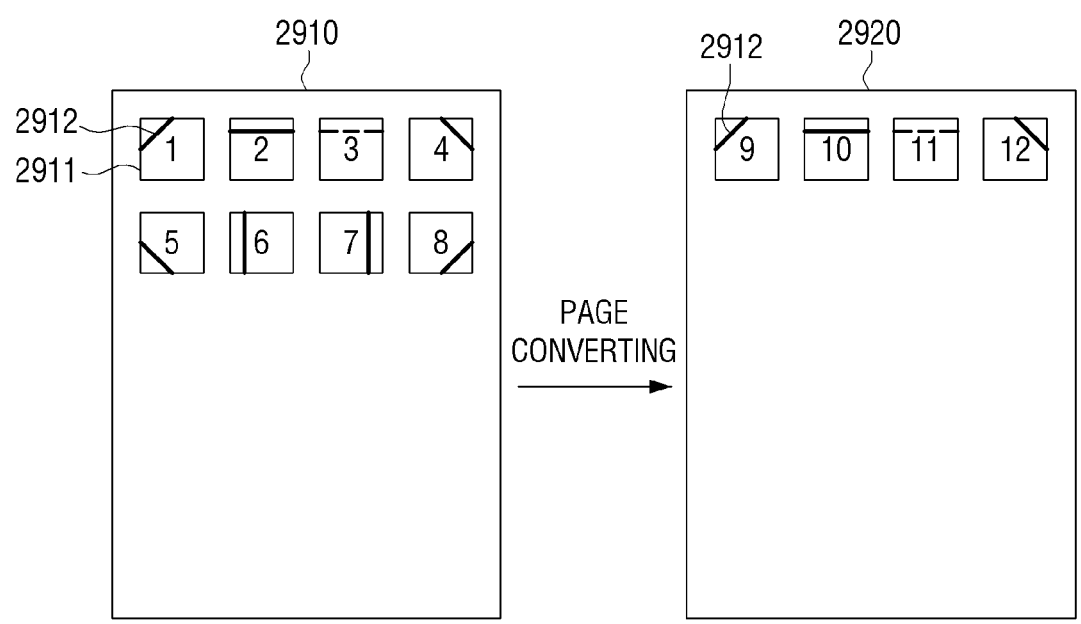
FIG. 29 illustrates an example of a method for displaying a bending interaction guide while converting the screen.

FIG. 29 illustrates an exemplary embodiment of displaying the bending interaction guide uniquely set with respect to marking position on the screen.

Referring to FIG. 29, the flexible display apparatus 100 displays main screens 2910, 2920 which are divided into a plurality of pages. A user may convert the main screens 2910, 2920 with methods flicking the screen toward one direction by touching the screen or bending the flexible display apparatus 100.

On each page of the main screens, respective icons which a user arranges may be displayed. Referring to FIG. 29, icons 1 to 8 (2911) are displayed on the first page screen 2910 and icons 9 to 12 are displayed on the second page screen 2920.

When converting page is performed, the controller 120 uniformly sets bending with respect to each marking position where each object is displayed to new objects according to the marking position where each new object is displayed after converting. In other words, a first bending corresponding to icon 1 of the first page screen 2910 is uniformly set to icon 9 of the second page screen 2920. When the first bending is sensed while displaying the first page screen 2910, the controller 120 performs operations corresponding to icon 1. Meanwhile, when the first bending is sensed while displaying the second page screen 2920, the controller 120 performs operation corresponding to icon 9. Bending corresponding to icons 2 to 4 is uniformly set to icons 10 to 12. FIG. 29 illustrates four icons on the second page screen 2920; however, when eight icons are displayed, bending corresponding to icons 5 to 8 may be used for icons of the second page screen 2920.

When the bending is newly set with respect to new objects displayed on the screen after converting, the controller 120 may add and display bending interaction guide 2912 regarding bending newly set to the new objects. Referring to FIG. 29, the bending interaction guide added to icons 1 to 4 is added uniformly to icons 9 to 12. As a result, the bending interaction guide 2912 may be displayed in the same pattern as the previous page according to the marking position of the objects on the screen, when converting screen is performed.

Figure 30:
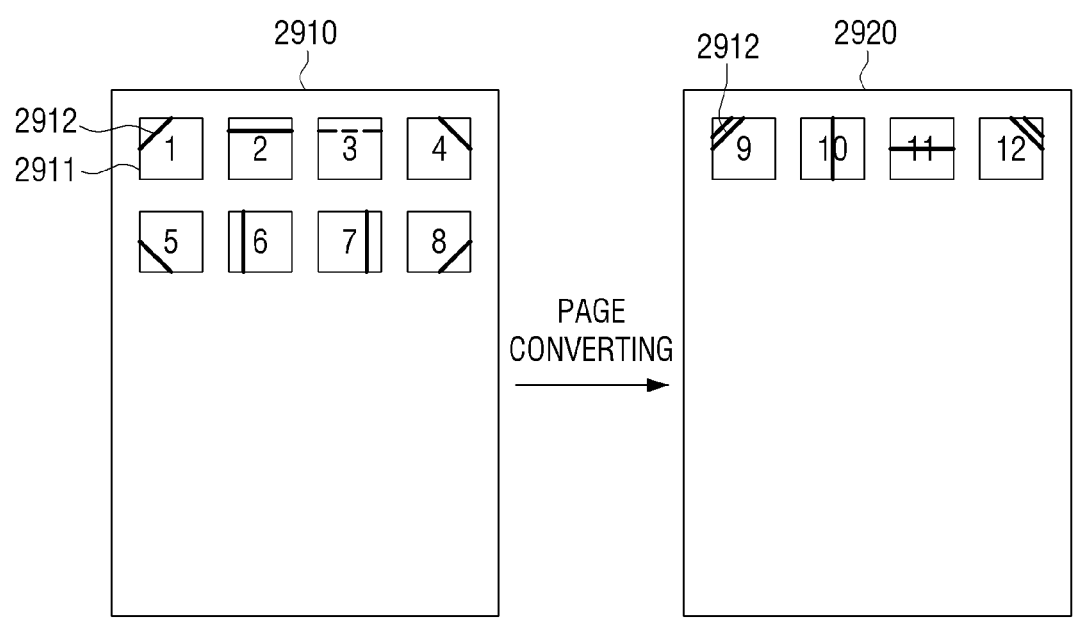
FIG. 30 illustrates another example of a method for displaying bending interaction guide while converting screen.

FIG. 30 illustrates screen of the flexible display apparatus 100 according to an exemplary embodiment in which the bending interaction guide is uniquely set with respect to each object. For convenient explanation, screen constitution, number of objects displayed on the screen, and object marking position are illustrated as the same as in FIG. 29.

Referring to FIG. 30, when the second page screen 2920 is displayed while displaying the first page screen 2910, a new bending interaction guide different from the bending interaction guide displayed on the first page screen 2910 is displayed on the second page screen 2920. The bending interaction guide may visually express bending uniquely set with respect to each object.

Although not illustrated in FIG. 30, when converting to a third page screen, original bending may be set regarding icons newly displayed on the third page screen, and corresponding bending interaction guide may be displayed.

Although FIGS. 27 to 30 illustrate various bending interaction guides expressed in line shape, the character guide or the symbol guide may be added to the bending interaction guide, and the guide may be expressed in various shapes, as described above. The following will specifically explain types of the bending interaction guide and corresponding bending.

Further, although the above drawings illustrate that the bending interaction guide is added to every object within the screen, whether to display the bending interaction guide may be selectively determined. For example, a user may set whether to use the bending interaction guide through a set menu. When the function to display the bending interaction guide is ON, various bending interaction guides are provided as described above. Meanwhile, when the function to display the bending interaction guide is OFF, objects except the bending interaction guide are displayed.

Further, whether to use the bending interaction guide may be set with respect to each object. For example by referring to FIG. 30, it may be set such that the bending interaction guides are displayed for objects 1 and 2, and the bending interaction guides are not displayed for objects 3 to 12. In this case, according to a set situation, the bending interaction guide is displayed or un-displayed per object.

Further, whether to use the bending interaction guide may be set with respect to each page. For example by referring to FIG. 30, it may be set such that the bending interaction guides are displayed for the first page 2910, and un-displayed for the second page 2920. Therefore, objects 9 to 12 may be displayed without adding the bending interaction guides on the second page 2920.

Further, whether to use the bending interaction guide is set with respect to each application. It may be set such that the bending interaction guides are displayed on the main screen described in FIG. 27 and un-displayed on the application implementing screen of FIG. 28. In this case, even when the mail application is implemented as in FIG. 28, and when the screen of FIG. 28 is displayed, the bending interaction guides are not displayed.

Besides, whether to display the bending interaction guide may be determined selectively according to various standards.

The bending interaction guide may include the line image guide which is at least one of a line width, a line number, a line shape, a line direction, a line position, a line angle, a line color, a line size, and a line length are adjusted.

FIG. 31 illustrates bending interaction images (a) to (l) corresponding to bending which curves the flexible display apparatus toward a first direction. The first direction indicates a direction in which a user bends the display based on the surface of the flexible display apparatus.

When the flexible display apparatus is square shape, bending may include bending and flat, which bends and spreads the upper left, the upper right, the lower left, the lower right, the left boundary, the upper boundary, the right boundary, and the lower boundary, horizontal folding which folds the center toward a left or right direction, vertical folding which folds the center toward an upper or lower direction, and bending and hold which folds and keeps the edges or the boundaries.

Therefore, what is displayed may include: bending interaction guide (a) in which a line is marked on the upper left edge, bending interaction guide (b) in which a line is marked on the upper right edge, bending interaction guide (c) in which a line is marked on the lower left edge, and bending interaction guide (d) in which a line is marked on the lower right edge. Further, what is displayed may include bending interaction guide (e) in which a line is marked on the left boundary, bending interaction guide (f) in which a line is marked on the upper boundary, bending interaction guide (g) in which a line is marked on the right boundary, and bending interaction guide (h) in which a line is marked on the lower boundary. Further displayed may include bending interaction guide (i) to mark a vertical line which displays a bending line when the horizontal folding is performed, and bending interaction guide (j) to mark a horizontal line which displays a bending line when the vertical folding is performed. Such bending interaction guides (a) to (j) may be displayed in a solid line.

Bending and hold may be expressed as a thick solid line. Referring to FIG. 31, what is displayed may include bending interaction guide (k) which indicates bending and hold keeping the upper left edge after bending, and bending interaction guide (l) which indicates bending and hold keeping the right boundary after bending. Although FIG. 31 illustrates bending interaction guides (k), (l) regarding bending and hold on the upper left edge and the right boundary, bending interaction guides (k), (l) corresponding to other movements may be displayed when bending and hold is set with respect to other areas. Thus, other bending interaction guides (a) to (j) of FIG. 31 may be expressed in a thick solid line.

Although FIG. 31 describes the bending interaction guide when bending is made toward the first direction, the bending interaction guide may be displayed when bending is made toward a second direction.

FIG. 32 illustrates bending interaction guides when bending is made toward the second direction. Referring to FIG. 32, the bending interaction guides are expressed in a dotted line when bending is made toward the second direction. Bending interaction guides (a) to (l) of FIG. 32 are expressed when the bending of FIG. 31 is performed on the contrary of the first direction, i.e., a backside direction.

Referring to FIGS. 31 and 32, the bending interaction guides may be expressed by setting line features to be a solid line or a dotted line according to the bending directions. Further, the bending interaction guides may be expressed to be a thin solid line or a thick solid line according to whether it is bending and flat or bending and hold. Other than a dotted line, various line features such as one-dot chain line and two-dot chain line may be also used.

Although line features are different according to whether it is the first direction or the second direction in FIGS. 31 and 32, bending direction may be expressed by using the character guide or the symbol guide.

Figure 33:
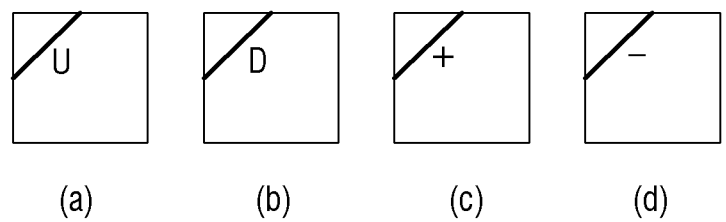

FIG. 33 illustrates bending interaction guide (a) which character guide U is added to express bending toward a first direction, bending interaction guide (b) which character guide D is added to express bending toward a second direction, bending interaction guide (c) which symbol guide + is added to express bending toward the first direction, and bending interaction guide (d) which symbol guide − is added to express bending toward the second direction.

In summary, the bending position, the bending shape, and the bending direction may be intuitively informed by using line position, line features, line depth, the character guide, and the symbol guide.

When a plurality of bending operations are performed in a uniform shape on uniform area, a plurality of bending operations may be set to operate differently from that of one bending. In this case, the bending interaction guide to express a bending number may be necessary.

FIG. 34 illustrates various examples of the bending interaction guides which express a bending number. Referring to FIG. 34, the bending number may be expressed with a number of dots (a, b) added on the line, numbers (c, d), and the number of lines (e, f). For example, the bending interaction guide (a) having two dots, the bending interaction guide (c) having the number 2, and bending interaction guide (e) expressed in two lines indicate that bending should be performed twice. Bending interaction guide (b) having three dots, bending interaction guide (d) having the number 3, and bending interaction guide (e) expressed in three lines indicate that bending should be performed three times. Although the number is expressed around the line in FIG. 34, it may be overlapped and displayed on the line.

Additionally, various controlling operations may be set according to the bending angle or the bending degree. For example, when bending is made by 30° while implementing the electronic book application and displaying electronic book contents, a first controlling operation may be performed to turn a first page into a second page on a page-by-page basis. When bending is made by 60°, a second controlling operation may be performed to turn a plurality of pages at once. Therefore, it is necessary that the bending angle or the bending degree is informed through the bending interaction guide.

FIG. 35 illustrates various examples of the bending interaction guides which express the bending angle or the bending degree. Referring to FIG. 35, what is displayed may include bending interaction guides (a), (b) which express the bending angle with the number, and bending interaction guides (c), (d) which express the bending angle with a graphic symbol. In FIG. 35, the line image guide indicates bending position, and the number or the symbol indicates bending angle or bending degree. The number and the symbol of FIG. 35 may be also overlapped and displayed on the line.

Additionally, various controlling operations may be set according to bending hold time. For example, in the case that an electronic book application is implemented, and electronic book contents are displayed, when bending is made for one second, a first controlling operation may be performed to turn a first page into a next on a page-by-page basis. When bending is made for three seconds, a second controlling operation may be performed to turn a plurality of pages at once. Therefore, bending hold time may be informed through the bending interaction guide.

Figure 36:
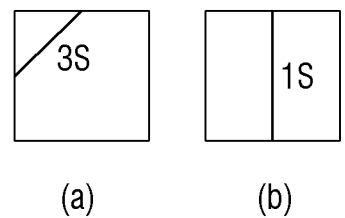

FIG. 36 illustrates examples of the bending interaction guides which express bending hold time. Referring to FIG. 36, bending interaction guides (a), (b) express the line image guides which indicate bending position with characters 1 s and 3 s which indicate bending hold times of 1 second and 3 seconds. A user may intuitively recognize bending methods by viewing bending interaction guides (a), (b) of FIG. 36.

Additionally, when functions matched with multi bending which bends different areas at several times are provided, the bending interaction guide which expresses the bending order may be displayed so that a user can recognize the bending order.

FIG. 37 illustrates various examples of the bending interaction guide in which respective numbers are added to express the bending order. Referring to FIG. 37, when a first bending is made toward a second direction, and when a second bending is made toward a first direction, what is displayed may include bending interaction guide (a) in which the number, 1, is expressed with a dotted line, and the number, 2, is expressed with a solid line. Further, bending interaction guides (b), (c), (d) may be displayed, added with a plurality of the line guide images indicating bending direction and bending area, and the number indicating bending order.

Further, as described above, the special shape of bending such as rolling, swing or shaking may be used. In this case, various bending interaction guides may be provided to express each bending.

Figure 38:
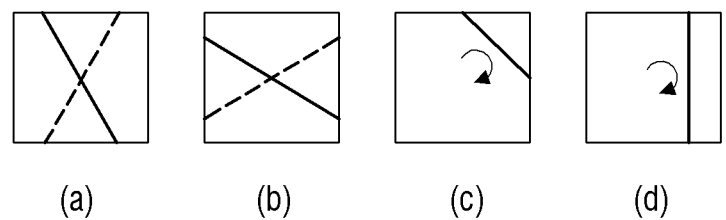

FIG. 38 illustrates various examples of the bending interaction guides to express special bending. Referring to FIG. 38, regarding twisting which twists the flexible display apparatus 100, what is displayed may include bending interaction guides (a), (b) which are expressed in a solid line and a dotted line crossed to each other according to twisting features.

Further, in order to express rolling, what is displayed may include bending interaction guides (c), (d) which include the line guide images indicating starting position of rolling and arrow images indicating rolling movement.

The above describes that a shape or a method of bending is expressed with the various methods which combine the line guide images, the character guides, and the symbol guides. However, the bending interaction guides may be displayed only with texts while excluding the line guide images.

The above various exemplary embodiments describe the respective screens based on the cases where the flexible apparatus is implemented as a flexible display apparatus including the display. However, the flexible apparatus may be implemented as device which is connected to an external display apparatus and controls operations thereof.

Figure 39:
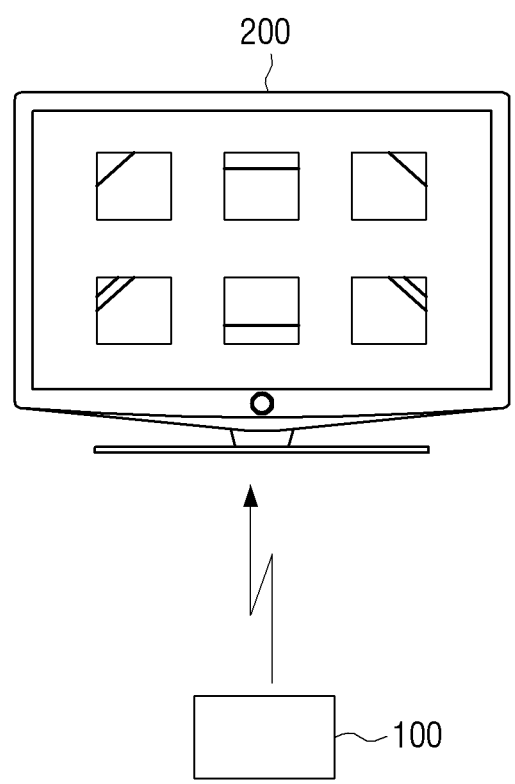
FIG. 39 is a diagram provided to explain a flexible apparatus which controls operations of a display apparatus according to another exemplary embodiment.

FIG. 39 illustrates the constitution of a flexible apparatus which interoperates with an external display apparatus according to another exemplary embodiment.

Referring to FIG. 39, the flexible apparatus 100 may connect to a display apparatus 200 wired or wirelessly. The flexible apparatus 100 is manufactured with flexible material, and can be bent arbitrarily by a user while the display apparatus 200 may be implemented as a general display apparatus which is not flexible. Specifically, various types of display apparatuses such as a television (TV), electronic frame, monitor, or ad panel may be implemented.

The display apparatus 200 displays a screen including respective objects added with the bending interaction guides.

According to an exemplary embodiment, the screen including objects added with the bending interaction guides may be created and displayed by the display apparatus 200.

The display apparatus 200 previously stores bending information matched with each controlling operation and the bending interaction guides. The bending information may be named as bending shape information or bending method information. Thus, when the display apparatus 200 turns on and displays the main screen, or implements respective applications or functions and displays the implementing screen, the bending interaction guides regarding the objects are displayed when there are objects matched with bending.

When controlling signals corresponding to bending are received from the flexible apparatus that can be bent, the display apparatus 200 performs controlling operations according to the controlling signals. The controlling signals may be implemented as Infra Red (IR) signals or communication signals which are transmitted through various interfaces such as Bluetooth, NFC, WiFi, Zigbee, or serial interface.

Further, the 'bending interaction guide' indicates guide images which visually express a bending shape or a bending method set with respect to each object, as described above. Types and shapes of the bending interaction guide and controlling operations corresponding to bending are described by referring to the above various exemplary embodiments, which will not be further explained. When the display apparatus 200 creates and displays the bending interaction guide in itself according to the exemplary embodiments, the flexible apparatus 100 may operate as a simple remote controller. The flexible apparatus 100 may exclude the display 150 and the graphic processor 130, include the sensor 110, the controller 120, and the storage 140, and further include a remote controller signals transmitter (not illustrated) separately. The storage 140 may store respective commands corresponding to bending. When bending is sensed by the sensor 110, the controller 120 may detect commands corresponding to the sensed bending from the storage 140, generate controlling signals corresponding to the commands, i.e., remote controller signals, and transmit the signals to the display apparatus 200 through the remote controller signals transmitter. Commands stored in the storage 140 may be previously allocated and stored per bending that the display apparatus 200 supports.

According to another exemplary embodiment, the flexible apparatus 100 may transmit information regarding the bending interaction guide to the display apparatus 200, or transmit data regarding screens which include objects added with the bending interaction guide to the display apparatus 200 so that it can display the screens. In other words, the display apparatus 200 may display objects added with the bending interaction guide based on respective information provided from the flexible apparatus 100. When controlling signals corresponding to bending are received while displaying objects, the display apparatus 200 performs operations corresponding to the controlling signals.

Figure 40:
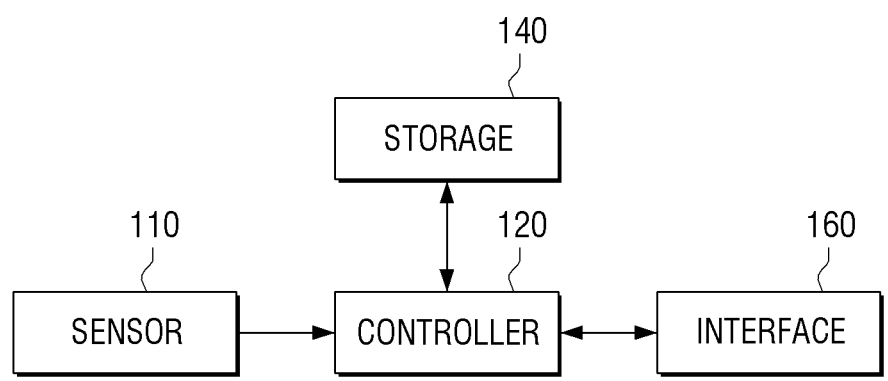
FIG. 40 is a block diagram of a flexible apparatus according to the exemplary embodiment of FIG. 39.

FIG. 40 is a block diagram of constitution of the flexible apparatus 100 according to an exemplary embodiment which displays the bending interaction guide by using an external display apparatus.

Referring to FIG. 40, the flexible apparatus 100 includes the sensor 110, the controller 120, the storage 140, and an interface 160.

The sensor 110 and the storage 140 are the same as the above descriptions in FIGS. 1 and 2, which will not be further explained.

The interface 160 connects to the display apparatus 200. The interface 160 may connect to the display apparatus 200 with various wired or wireless communication methods such as USB interface, WiFi, Zigbee, IEEE, and Bluetooth.

The controller 120 may transmit information regarding objects and the bending interaction guide added with the objects to the display apparatus 200 so that the display apparatus 200 can display a screen including the objects and the bending interaction guide.

Further, when bending is sensed by the sensor 110, the controller 120 may transmit controlling signals indicating controlling operations corresponding to the sensed bending to the display apparatus 200. Therefore, a user can control operations of the external display apparatus 200 by bending the flexible apparatus 100.

When the graphic processor is further added in the exemplary embodiment of FIG. 40, the controller 120 may render the screen itself which includes the objects and the bending interaction guide, and transmit the rendering data to the display apparatus 200.

Figure 41:
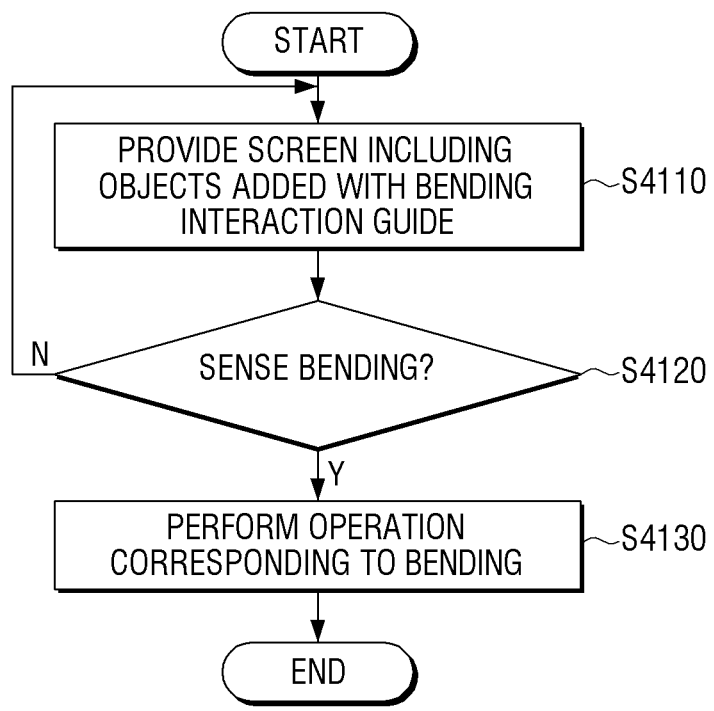
FIG. 41 is a flowchart which illustrates a control method of a flexible apparatus according to various exemplary embodiments.

FIG. 41 is a flowchart provided to explain a control method of the flexible apparatus according to various exemplary embodiments. Referring to FIG. 41, the flexible apparatus provides a screen including objects added with the bending interaction guide regarding bending at operation S4110. The bending interaction guide may be a guide which is uniquely set with respect to each object or per marking position on the screen. The bending interaction guide is specifically illustrated in the above discussion, which will not be further explained.

When the flexible apparatus connects to the external display apparatus without including an internal display, the flexible apparatus may transmit information regarding objects and the bending interaction guide added with the objects to the display apparatus which is connected to the flexible apparatus, and display the screen through the display apparatus.

Further, when the flexible apparatus includes the display, the flexible apparatus may create a screen including at least one object respectively added with the bending interaction guide, and display the screen through the display.

A user may input various bending operations by viewing the bending interaction guide. The flexible apparatus may sense bending with various methods as described above at operation S4120.

When a bending set with respect to the object displayed on the screen is sensed, the flexible apparatus performs operations corresponding to the object at operation S4130. When the flexible apparatus is connected to an external display apparatus, controlling signals corresponding to bending may be transmitted to the display apparatus. When the flexible display apparatus includes a display, various operations according to bending may be implemented.

Accordingly, when bending is made, an application corresponding to the object corresponding to the bending may be implemented. Specifically, when bending corresponding to the game icon is performed, a corresponding game application may be implemented, and when bending corresponding to the telephone icon is performed, the telephone connect screen including number pads may be displayed. Additionally, when bending corresponding to the contact menu is performed, a prestored contact list is displayed on the screen. Accordingly, when bending matching the object is performed, a program corresponding to the object is implemented.

When bending set for basic functions which are not expressed by objects is performed, basic functions may be implemented according to the bending. For example, various controlling operations such as turn on, turn off, channel convert, volume adjust, size adjust, page convert, contents convert, application implement, implement finish, go to background screen, widget display, widget display delete, contents play begin, play finish, pause, rewind and fast wind may be started by bending.

Although not described in FIG. 41, the flexible apparatus may set uniform bending for the marking position of each object on the screen before converting to new objects displayed on the screen after converting according to the marking position, when converting screen is performed. Thus, the bending interaction guide regarding bending set for new objects may be added with new objects and displayed.

As described above the flexible apparatus may be implemented as various types of devices. For example, the flexible apparatus may be implemented as various types of devices such as cellular phone, PDA, remote controller, tablet PC, electronic note, and notebook PC. In this case, additional units may be further included other than the above units.

Figure 42:
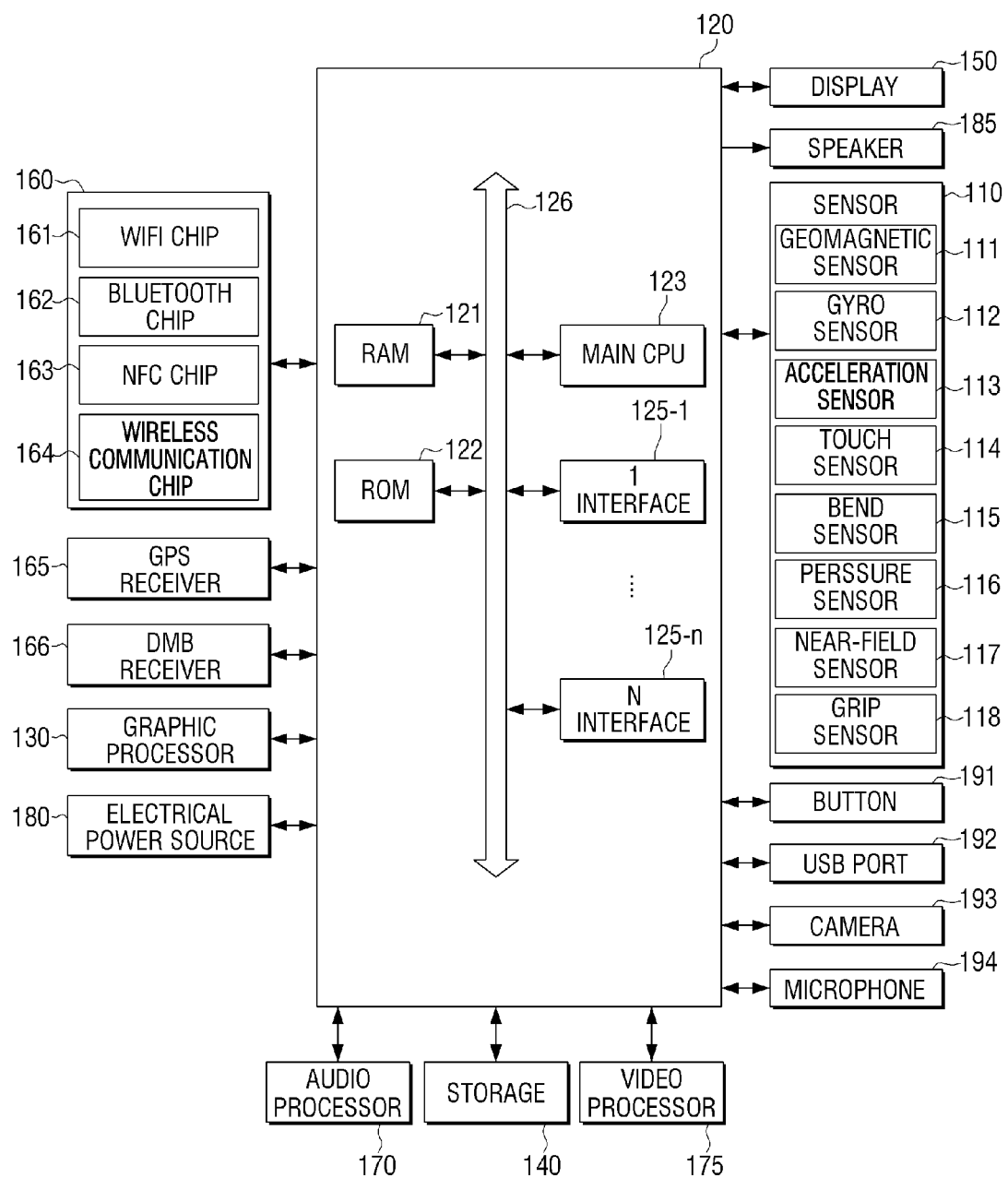
FIG. 42 is a block diagram of a flexible apparatus according to various exemplary embodiments.

FIG. 42 is a block diagram illustrating detailed constitution of the flexible apparatus which may be implemented as a cellular phone. Referring to FIG. 42, the flexible apparatus includes the sensor 110, the controller 120, the graphic processor 130, the storage 140, the display 150, a communicator 160, a global positioning system (GPS) receiver 165, a digital multimedia broadcasting (DMB) receiver 166, an audio processor 170, a video processor 175, an electrical power source 180, a speaker 185, a button 191, an USB port 192, a camera 193, and a microphone 194.

The sensor 110 includes a geomagnetic sensor 111, a gyro sensor 112, an acceleration sensor 113, a touch sensor 114, a bend sensor 115, a pressure sensor 116, a near-field sensor 117, and a grip sensor 118. The sensor 110 may sense various manipulations such as touch, rotate, slide, pressure, and approach regarding the flexible apparatus other than bending described above.

The geomagnetic sensor 111 is sensor which senses rotating situations and movement direction of the flexible apparatus 100. The gyro sensor 112 is sensor which senses the rotating angle of the flexible apparatus 100. Both of the geomagnetic sensor 111 and the gyro sensor 112 may be included; however, when including one of them, the flexible apparatus 100 may sense a rotating situation.

The acceleration sensor 113 is sensor which senses sliding degree of the flexible apparatus 100. Besides, the acceleration sensor 113 may be used to detect bending features such as bending direction or bending area of the flexible apparatus 100.

The touch sensor 114 may be capacitive or decompressive. The capacitive method is to use the conductive layer coated on the surface of the display 150 and to calculate touch coordinates by sensing micro-electrical currents excited by a user body when a part of a user body touches the surface of the display 150. The decompressive method is to include two electrode substrates and to calculate touch coordinates by sensing flows of electrical currents caused by contacting upper and lower substrates of the touched point, when a user touches the screen. The touch sensor 114 may be implemented as various shapes.

The bend sensor 115 is implemented in various shapes and numbers as described above, and senses bending situations of the flexible apparatus 100. Various exemplary embodiments regarding constitution and operations of the bend sensor 115 are described above, which will not be further explained.

The pressure sensor 116 senses strength of pressure given to the flexible apparatus 100 when a user touches or manipulates bending and provides the sensed pressure to the controller 120. The pressure sensor 116 may be mounted within the display 150 and may include piezo film which outputs electrical signals corresponding to the strength of pressure. FIG. 42 illustrates that the touch sensor 114 and the pressure sensor 116 are separately arranged. However, when the touch sensor 114 is implemented as a decompressive touch sensor, the decompressive touch sensor may also perform a role of the pressure sensor 116.

The near-field sensor 117 is sensor which senses approaching motion without contacting the surface of the display. The near-field sensor 117 forms a high frequency magnetic field, and may be implemented as various types of sensors such as high frequency departure type which senses electrical currents induced by magnetic field features changed by approaching the object, magnetic type which uses magnetics, and capacitive charge type which senses capacitive charges changed by approaching the object.

The grip sensor 118 may be arranged on the boundary or the hand grip part of the flexible apparatus 100 separately from the pressure sensor 116, and sense a user's grip. The grip sensor 118 may be implemented as a pressure sensor or a touch sensor.

The controller 120 determines the user's intention by analyzing respective sensing signals sensed in the sensor 110, and performs operations corresponding to the determined intention. The controller 120 may perform controlling operations according to various input methods such as touch manipulation, motion input, voice input, and button input other than bending. For touch manipulation, there are various manipulations such as simple touch, tap, touch and hold, move, flick, drag and drop, pinch in, and pinch out.

For example, the controller 120 may implement an application stored in the storage 140, generate and display the implementing screen, or play respective contents stored in the storage 140. Further, the controller 120 may perform communication with external devices through the communicator 160.

The communicator 160 performs communication with various types of external devices according to various types of communication methods. The communicator 160 includes WiFi chip 161, Bluetooth chip 162, near field communication (NFC) chip 163, and wireless communication chip 164.

WiFi chip 161, Bluetooth chip 162, and NFC chip 163 perform communication according to WiFi methods, Bluetooth methods, and NFC methods, respectively. NFC chip 163 indicates a chip operating in NFC method which uses 13.56 MHz bandwidth among various RF-ID frequency bandwidths such as 135 KHz, 13.56 MHz, 433 MHz, 860~960 MHz, and 2.45 GHz. When WiFi chip 111 or Bluetooth chip 112 is utilized, respective connecting information such as SSID and session key, may be first transmitted and received, communication is connected by using the information, and respective information is transmitted and received. Wireless communication chip 164 indicates a chip which performs communication according to various communication protocols such as IEEE, Zigbee, 3rd Generation (3G), 3rd Generation Partnership Project (3GPP), and long term evolution (LTE).

The GPS receiver 165 receives GPS signals from GPS satellites, and calculates current position of the flexible apparatus 100.

The DMB receiver 166 receives and processes DMB signals.

The graphic processor 130 generates the bending interaction guide added with objects by using a calculator (not illustrated) and a renderer (not illustrated). The calculator calculates feature values such as coordinate values, shape, size, and color regarding the bending interaction guide to be displayed. The renderer creates graphic objects based on the feature values calculated in the calculator. The bending interaction guide created in the renderer is added with respective icons and displayed on the screen which the display 150 displays. The bending interaction guide may be created with a constitution which includes the line guide images having a variety of line widths, line numbers, line shapes, line directions, line positions, line angles, line colors, line sizes, and line lengths, and other various character or symbol guides to be suitable for bending features.

The electrical power source 180 provides electrical power to each unit of the flexible apparatus 100. The electrical power source 180 may be implemented to be a constitution which includes a positive polar current collector, a positive polar electrode, an electrolyte, a negative polar electrode, a negative polar current collector, and a cladding portion which covers the above units. The electrical power source 180 is implemented as a rechargeable battery that can be charged and discharged. The electrical power source 180 may be implemented as flexible type of power source, so as to be bent with the flexible apparatus 100. The current collectors, the electrodes, the electrolytes, may consist of material having flexible features. Specific constitution and material of the electrical power source 180 will be separately described below.

The audio processor 170 performs processing of audio data. Various processing such as decoding, amplifying and noise filtering regarding audio data may be performed by the audio processor 170.

The video processor 175 performs processing of video data. Various image processing such as decoding, scaling, noise filtering, frame rate converting, and resolution converting may be performed by the video processor 175.

The display 150 displays various screens and objects such as the video data processed in the video processor 175 and the bending interaction guide generated in the graphic processor 130. The constitution of the display 150 is specifically described above, which will not be further explained.

The speaker 185 outputs respective alarm sounds or voice messages as well as audio data processed in the audio processor 170.

The button 191 may be various types of buttons such as a mechanical button mounted on a voluntary area of the front face, the side face, and the back face in the exterior main body of the flexible apparatus 100, touch pad, and wheel.

The USB port 192 may perform communication with respective external devices including the display apparatus 200 through USB cables.

The camera 193 photographs still images or video images according to a user control. The camera 193 may be implemented in plural forms such as a front face camera and a back face camera.

The microphone 194 receives user voices and other sounds, and converts the receives user voices to audio data. The controller 120 may use user voices inputted through the microphone 194 while calling, or convert the user voices to audio data and store the audio data in the storage 140.

When the camera 193 and the microphone 194 are arranged, the controller 120 may perform controlling operations according to user voices inputted through the microphone 194 or user motions recognized by the camera 193. Therefore, the flexible apparatus 100 may operate in motion control mode or voice control mode. When operating in motion control mode, the controller 120 activates the camera 193, photographs a user, traces changes in user motions, and performs corresponding controlling operation. When operating in voice control mode, the controller 120 may operate in voice recognize mode which analyzes user voices inputted through the microphone and performs controlling operations according to the analyzed user voices.

Various external input ports may be further included to connect to other external components such as a headset, a mouse, and a LAN.

The operations of the controller 120 as described above may be performed by programs stored in the storage 140. In the storage 140, various data may be stored such as O/S software to drive the flexible apparatus 100, respective applications, respective data which are inputted or set when an application is being implemented, contents, bending information, and bending interaction guide information.

The controller 120 controls general operations of the flexible apparatus 100 by using respective programs stored in the storage 140. Further, the controller 120 may control operations of the display apparatus 200 when the external display apparatus 200 is connected through the interface 160.

The controller 120 includes RAM 121, ROM 122, main CPU 123, 1 to n interfaces 125-1~125-n, and a bus 126.

RAM 121, ROM 122, main CPU 123, and 1 to n interfaces 125-1~125-n may connect to each other through the bus 126.

1 to n interfaces 125-1~125-n connect to the above units. One of the interfaces may be a network interface which connects to an external device through network.

Main CPU 123 accesses the storage 140, and performs booting by using O/S stored in the storage 140. Further, various operations may be performed by using respective programs, contents, and data stored in the storage 140.

ROM 122 stores command sets for system booting. When electrical power is provided by inputting a command to power on, main CPU 122 copies O/S stored in the storage 140 on RAM 121 according to the command stored in ROM 122, and boots the system by implementing O/S. When booting is completed, main CPU 123 copies respective application programs stored in the storage 140 on RAM 121, and performs respective operations by implementing the application programs copied on RAM 121.

FIG. 42 comprehensively illustrates respective units that can be mounted when the flexible apparatus is implemented as cellular phone. Therefore, according to the exemplary embodiments, parts of the modules in FIG. 42 may be deleted, modified, or new units may be added.

Meanwhile, as described above, the controller 120 may perform various operations by implementing programs stored in the storage 140.

Figure 43:
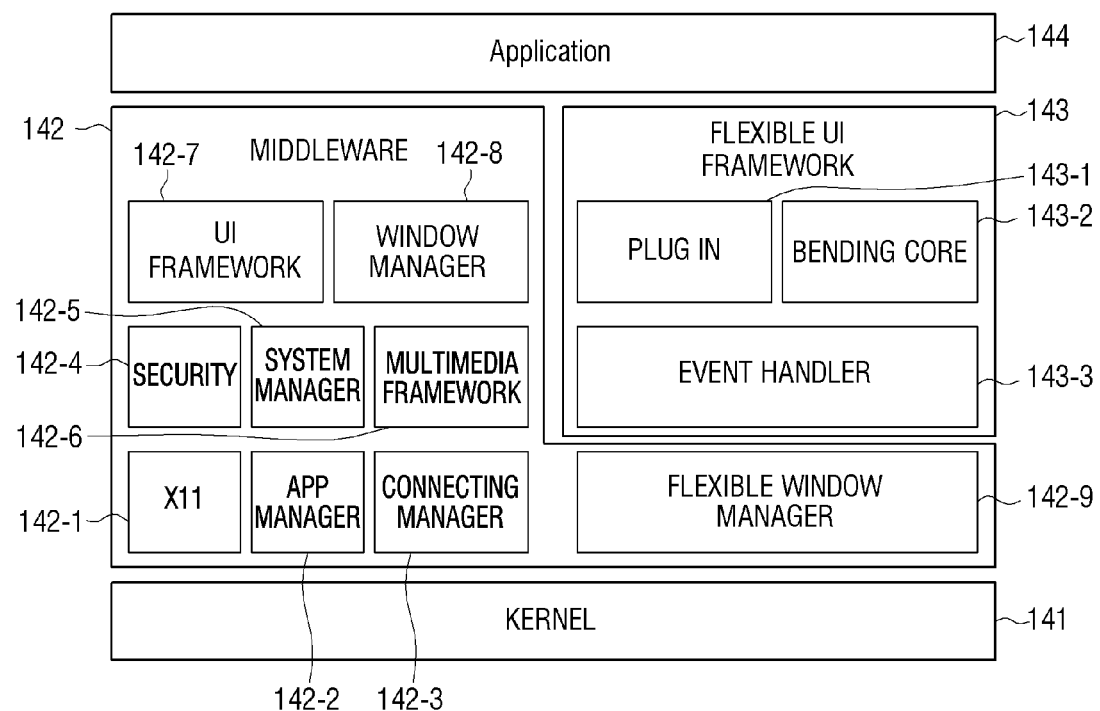
FIG. 43 is a structure map of software that can be used in the flexible apparatus of FIG. 42.

FIG. 43 is a diagram which illustrates a class of software stored in the storage 140. Referring to FIG. 43, kernel 141, middleware 142, flexible UI framework 143, and application 144 are stored in the storage 140.

The kernel 141 performs a gateway role which delivers sensing signals of sensors included in the sensor 110 to the middle ware 142 or the flexible UI framework 143.

The middleware 142 includes respective software module which controls operations of the flexible apparatus 100. Referring to FIG. 43, the middleware 142 includes X11 module 142-1, APP manager 142-2, connecting manager 142-3, security module 142-4, system manager 142-5, multimedia framework 142-6, UI framework 142-7, window manager 142-8, and flexible window manager 142-9.

X11 module 142-1 is a module which receives respective events from respective hardware included in the flexible apparatus 100. Events may be variously set such as an event generating system alarm, an event opening or closing implementation of a specific program as well as an event sensing touch, bending or other user manipulations.

APP manager 142-2 is a module which manages implementing situations regarding respective applications installed in the storage 140. When an event inputting a command to implement an application is sensed from the X11 module 142-1, the APP manager 142-2 calls and implements the application corresponding to the event.

The connecting manager 142-3 is module which supports wired or wireless network connections. The connecting manager 142-3 may include various detailed module such as DNET module and UPnP module.

The security module 142-4 is a module which supports certification of hardware, request permission, and secure storage.

The system manager 142-5 monitors the situation of each unit within the flexible apparatus and provides the monitoring results to other modules. For example, when the battery is short, when errors occur, or when the communication disconnects, the system manager 142-5 may output alarm messages or alarm sounds by providing the monitoring results to UI framework 142-7.

The multimedia framework 142-6 is a module which plays multimedia contents stored in the flexible apparatus 100 or provided from external sources. The multimedia framework 142-6 may include a player module, a camcorder module and a sound processing module. Accordingly, operations may be performed to create and play screens and audio sounds by playing respective multimedia contents.

UI framework 142-7 is module which provides respective UI. UI framework 142-7 may include an image compositor module which constitutes respective image objects, a coordinate compositor module which calculates coordinates that image objects are expressed, a rendering module which renders the constituted image objects on the calculated coordinates, and a 2D/3D UI tool kit which provides the tool to constitute a UI in 2D or 3D format.

The window manager 142-8 may sense a touch event sensed by the touch sensor or sense input event inputted by other input means. The window manager 142-8 delivers the event to UI framework 142-7 when such an event is sensed so as to perform operations corresponding to the event.

The flexible window manager 142-9 is a module which manages the system according to the bending when bending is sensed. The flexible window manager 142-9 delivers the bending event to a flexible UI framework 143 when a bending event is sensed to occur.

The flexible UI framework 143 includes a plug in module 143-1, a bending core 143-2, and an event handler module 143-3. The plug in module 143-1 performs a role in connecting and loading the flexible UI framework 143 to the middleware 142. In FIG. 43, the kernel 143, the middleware 142, and the application 144 may be used as in the software of related art electronic devices, and the flexible UI framework 143 may be connected by using the plug in module 143-1. Therefore, while keeping compatibility with related art systems, and controlling operations according to bending may be additionally provided.

The event handler 143-3 is a module which controls operations according to the bending when bending occurs. The event handler 143-3 receives respective bending events from the flexible window manager 142-9 through the plug in module 143-1, and classifies the events according to the priority order per event. Herein, bending event indicates an event in which the specific shape of the bending is sensed.

The bending core 143-2 performs cueing of the bending events classified by the event handler 143-3, and matches the bending events with corresponding programs such as applications and widgets. Accordingly, programs matched with the bending events are implemented.

The bending core 143-2 may transmit rendering event signals to additionally render the bending interaction guide corresponding to each bending shape on objects to UI framework 142-7 through the plug in module 143-1. Therefore, the bending interaction guide may be overlapped and displayed with each object on the screen. Further, when specific bending occurs and the screen needs to be converted, the bending core 143-2 may deliver rendering event signals rendering the screen to be converted to UI framework 142-7 through the plug in module 143-1.

Additionally, the application module 144 includes applications to support various functions. For example, the application module may include program a module to provide various services such as the navigation program module, the game module, the electronic book module, the calendar module and the alarm manager module.

Further, the storage 140 may also store various programs such as a sensing module to analyze the signals sensed in each sensor, a messaging module such as a messenger program, short message service (SMS) and multimedia message service (MMS) programs, and e-mail programs, call info aggregator program modules, VoIP modules, and web browser modules.

As described by referring to FIG. 43, the middleware 142 may be connected to control system operations according to other user manipulations than bending and the framework 143 to control system operations according to bending. Accordingly, compatibility with related art system software structure is provided. However, an exemplary embodiment is not limited to programming to such software structure, and accordingly, it may be designed so that one framework can manage all of normal user manipulations and bending manipulations.

Main CPU 123 displays the main screen when the flexible apparatus 100 turns on or locks off. Respective icons are displayed on the main screen. Main CPU 123 provides respective basic data to adjust the display situation of the bending interaction guide to the graphic processor 130 by using the flexible UI framework 143 and the UI framework 142-7. Basic data may be various data such as shape, position, size, color and display time of the bending interaction guide. Therefore, as described above, the graphic processor 130 generates the bending interaction guide, adds on the objects of the display 150 and displays them.

Respective program modules illustrated in FIG. 43 may be deleted, modified, or added in parts according to types and features of the flexible apparatus 100.

Although the above various exemplary embodiments describe that the flexible apparatus 100 is plane shaped, the flexible apparatus 100 may be implemented in various shapes. For example, the flexible display apparatus 100 may be implemented to be mounted within a main body which is manufactured in un-flexible material.

Figure 44:
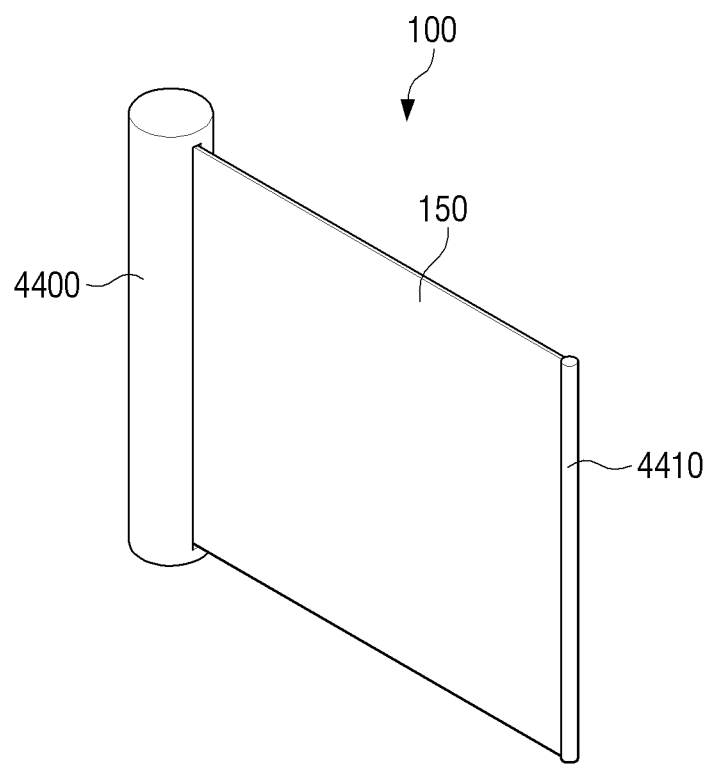
FIG. 44 illustrates exterior constitution of a flexible apparatus according to an exemplary embodiment.

FIG. 44 illustrates an exemplary embodiment of the flexible apparatus mounted within the main body.

Referring to FIG. 44, the flexible apparatus 100 may include a main body 4400, the display 150, and a grip part 4410.

The main body 4400 plays a role as a casing which contains the display 150 therein. When the flexible apparatus 100 includes various units as illustrated in FIG. 44, other units except the display and some sensors may be mounted on the main body 4400. The main body 4400 includes a rotating roller which rolls the display 150. Therefore, when not in use, the display 150 may be rolled based on the rotating roller and mounted within the main body 4400.

When a user grips and pulls over the grip part 4410, rolling is undone as the rotating roller rotates opposite to the rolling direction, and the display 150 comes out of the main body 4400. The rotating roller may include a stopper. Therefore, when a user pulls over the grip part 4410 beyond a certain distance, rotation of the rotating roller may stop by the stopper and the display 150 may be fixed. Thus, a user may implement respective functions by using the display 150 which comes out. When a user pushes a button to lift off the stopper, the stopper is lifted off, the rotating roller rotates on a contrary direction, and as a result, the display 150 may be rolled within the main body 4400. The stopper may be switch shaped which stops operation of a gear to rotate the rotating roller. Because the rotating roller and the stopper may be used as in related art rolling structures, specific description and explanation regarding both of them are not included.

Figure 45:
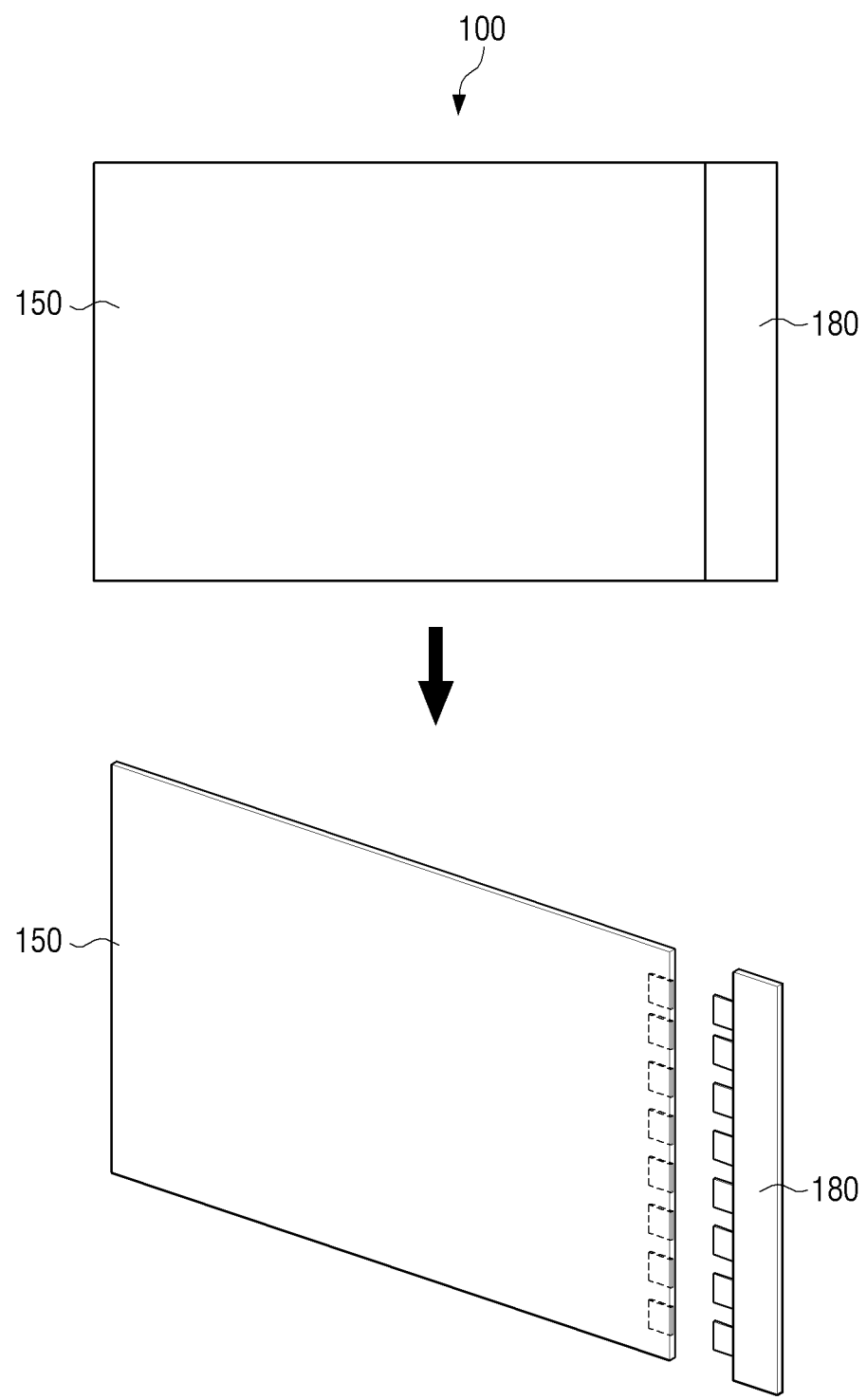
FIG. 45 illustrates an electrical power source which is connected to a flexible apparatus according to an exemplary embodiment.

The main body 4400 includes the electrical power source 180 (FIG. 45). The electrical power source 180 may be implemented as various shapes such as battery connector which the instant battery is arranged, rechargeable battery which can be recharged in plural number and solar battery which generates electricity by using solar heats. When a rechargeable battery is implemented, a user can charge the electrical power source by connecting the main body 4400 with an external electrical power source.

Although FIG. 44 illustrates a cylinder shape of the main body 4400, the shape of the main body 4400 is not limited thereto, and the main body may be implemented as square shape or other polygon shapes. Further, the display 150 may be also implemented as shape covering the exterior of the main body or other various shapes as well as shape which the display 150 comes out by pulling over from being mounted within the main body 4400.

FIG. 45 illustrates the flexible apparatus which the electrical power source 180 can be detached and attached. Referring to FIG. 45, the electrical power source 180 may be arranged on one boundary of the flexible apparatus, detached and attached.

The electrical power source 180 may be implemented in flexible material and bent with the display 150. Specifically, the electrical power source 180 may include the negative polar current collector, the negative polar electrode, the electrolyte, the positive polar electrode, the positive polar current collector, and the cladding portions which cover the previous units.

For example, the current collector may be implemented as alloyed metal such as TiNi group having good elastic features, pure metal such as copper aluminum, pure metal coated with carbon, conductive material such as carbon or carbon fiber, or conductive polymer such as polypyrrole.

The negative polar electrode may be manufactured with negative polar electrode material such as metal of Lithium, Na, Zn, Mg, Cd, metallic alloys for hydrogen accumulation, Pb, nonmetal of carbon, and polymer electrode material of organic sulfur.

The positive polar electrode may be manufactured with positive polar electrode material such as sulfur and metal sulfide, lithium transition metal oxide of $LiCoO_2$, $SOCl_2$, $MnO_2$, $Ag_2O$, $Cl_2$, $NiCl_2$, NiOOH, and polymer electrode. The electrolyte may be implemented as gel type which uses PEO, PVdF, PMMA, or PVAC.

The cladding portions may use related art polymer resin. For example, PVC, HDPE or epoxy resin may be used. Additionally, when material can be curved and bent freely while preventing damage of the battery, the material may be used for the cladding portions.

The positive polar electrode and the negative polar electrode within the electrical power source 180 may respectively include a connector which connects with external devices electrically.

Referring to FIG. 45, the connector is formed in a shape projected from the electrical power source 180, and grooves corresponding to position, size, and shape of the connector are formed on the display 150. Therefore, by combining the connector and the grooves, the electrical power source 180 may be combined with the display 150. The connector of the electrical power source 180 may be connected with an electrical power connecting pad (not illustrated) within the flexible apparatus 100 and provide electrical power.

Although FIG. 45 illustrates that the electrical power source 180 can be detached and attached on one side boundary of the flexible apparatus 100, this is merely exemplary. Position and shape of the electrical power source 180 may be varied according to product features. For example, when the flexible apparatus 100 is a product having a certain depth, the electrical power source 180 may be mounted on the back face of the flexible apparatus 100.

As described above, when the bending interaction guide is provided, a user may perform erroneous bending, or unintentional bending may be performed. In this case, the flexible apparatus 100 may provide feedback. Such feedback may be provided by using visual, auditory, and tactual senses.

Figure 46:
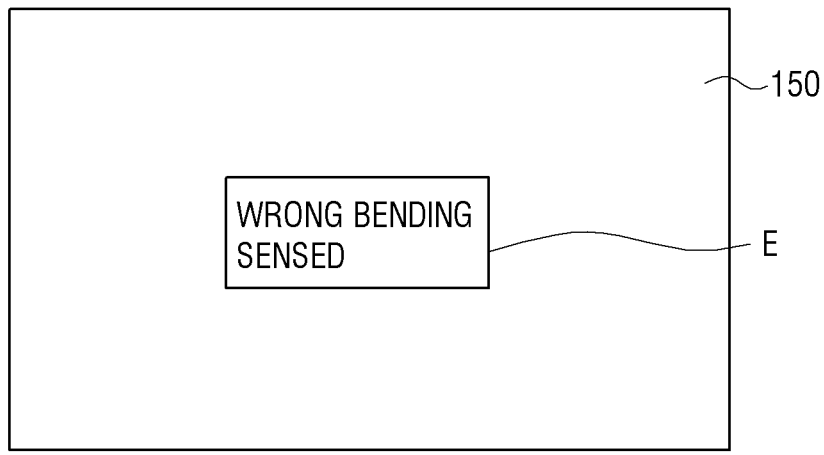
FIG. 46 illustrates a feedback method in response to a wrong bending according to an exemplary embodiment.

FIG. 46 illustrates that feedback is provided by using a visual message. Referring to FIG. 46, message E to inform that a wrong bending has occurred may be displayed on the display 150. Instead of the visual feedback in FIG. 46, voice feedback may be also provided. Examples of voice feedback may include various messages such as alarm sounds, voice messages to inform a wrong input, and voice messages to explain a correct bending input. Examples of tactual feedback may include vibrations over all of the flexible apparatus 100, vibration on a part of the surface which a user's body contacts, actuating operations to modify wrong bending line to convex form, actuating operations to automatically modify the flexible apparatus 100 to the correct bending shape, operations to inform a wrong input by generating capacitive electricity on the part which a user's body contacts, and an operation to inform wrong input by generating heat on the part which a user's body contacts.

In summary, according to the feedback, a user can immediately determine whether bending manipulation that he does not intend to do is performed, or whether an incorrect bending manipulation is performed, and performs a next movement in response. The above exemplary embodiment describes feedback operations regarding unintentional or wrong bending manipulations. However, such feedback operations may be also expanded and applied uniformly to wrong touch manipulation, wrong motion manipulation, and wrong voice manipulation. Also, when the operation is performed by determining bending manipulation that a user intends to do, positive feedback may be provided.

Although the above various exemplary embodiments describe that the bending interaction guide is always displayed with various types of objects, the bending interaction guide may be activated or deactivated by selection of a user according to another exemplary embodiment. Thus, the menu to control on or off of the bending interaction guide may be displayed on the screen of the flexible apparatus 100, or another function key may be installed on the main body. Therefore, when a user selects a corresponding menu or the function key, the bending interaction guide may be added and displayed, or deleted according to the selecting. Additionally, controlling on or off of the bending interaction guide may be performed by a separately set bending. For example, when a folding operation is matched, the bending interaction guide may be displayed by one folding and deleted by a next folding.

The bending interaction guide may not be displayed in usual situation, and may be displayed for a certain time when a user grips the flexible apparatus 100 to perform bending.

Figure 47:
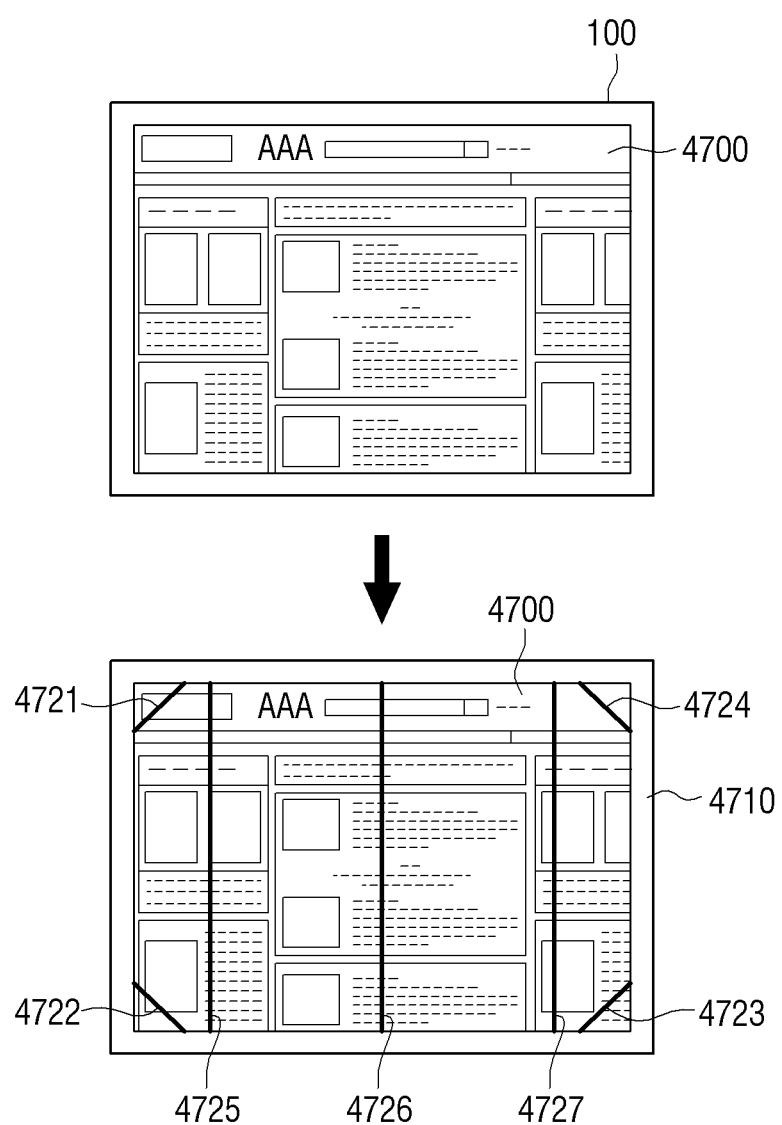
FIG. 47 illustrates an example of display screen in an exemplary embodiment which displays bending interaction guide according to whether a user grips.

FIG. 47 illustrates an example of screen constitution of the flexible apparatus 100 according to an exemplary embodiment. Referring to FIG. 47, a bezel 4710 is formed on the boundary area of the display 150 in the flexible apparatus 100.

The flexible apparatus 100 displays a screen 4700 through the display 150 when a specific application is implemented. Specifically, FIG. 47 illustrates that the web page is displayed after receiving web page data from the web server by implementing a web browser. When bending is performed, a controlling operation corresponding to the bending is made. However, the bending interaction guide is not displayed.

A user may grip the bezel 4710 to bend the flexible apparatus 100. The controller 120 of the flexible apparatus 100 may sense whether a user grips the bezel 4710 by using the grip sensor or the pressure sensor which is described above. When determining that a user grips the bezel 4710 with one hand or both hands, the controller 120 displays bending interaction guides 4721~4727. The bending interaction guides 4721~4727 may be displayed only when mapped with functions of the currently implementing application. Specifically, referring to FIG. 47, what is displayed may include (1) a bending interaction guide 4721 which expresses bending that bends and spreads the upper left edge, (2) a bending interaction guide 4722 which expresses bending that bends and spreads the lower left edge, (3) a bending interaction guide 4723 which expresses bending that bends and spreads the lower right edge, (4) a bending interaction guide 4724 which expresses bending that bends and spreads the upper right edge, (5) a bending interaction guide 4725 which expresses bending that bends and spreads the left boundary, (6) bending interaction guide 4726 which expresses folding that folds the center, and (7) bending interaction guide 4727 which expresses bending that bends and spreads the right boundary.

A user may perform specific types of bending according to at least one bending by viewing the bending interaction guides 4721~4727. Therefore, controlling operations corresponding to the bending are made.

For example, when the upper right edge is bent and spread according to bending interaction guide 4721, the screen 4700 moves toward a lower right direction. Further, when other edge parts are bent and flat according to the bending interaction guides 4722, 4723, and 4724, a web page area which is displayed on the screen may move according to the bending areas.

When the left boundary is bent and flat according to bending interaction guide 4725, the page is converted to a previous page. When the right boundary is bent and flat according to the bending interaction guide 4727, the page is converted to a next page. Meanwhile, when folding is performed according to the bending interaction guide 4726, web browsing finishes and the web page 4700 disappears.

Although FIG. 47 illustrates only the bending interaction guides 4721~4727 in line shape, this is merely exemplary, and symbols, images, and texts indicating controlling operations corresponding to the bending may be expressed together on surrounded areas or the lines of the bending interaction guides 4721~4727.

The method for mapping the objects with the bending, the method for displaying the bending interaction guide corresponding to the bending, and the method for controlling corresponding to the bending according to the above various exemplary embodiments may be implemented as programs and provided to the flexible apparatus.

For example, non-transitory computer readable medium may be provided, storing programs that perform providing the screen including the objects added with the bending interaction guide regarding the bending, sensing the bending of the flexible apparatus, and performing operations corresponding to the objects when the bending set with respect to the objects displayed on the screen.

Additionally, non-transitory computer readable medium may be provided, storing programs that perform the method for displaying the bending interaction guide according to the above various exemplary embodiments.

Non-transitory readable medium indicate medium which store data semi-permanently and can be read by devices, not medium storing data temporarily such as register, cache, or memory. Specifically, the above various applications or programs may be stored and provided in non-transitory readable medium such as CD, DVD, hard disk, Blu-ray disk, USB, memory card, or ROM.

Further, the foregoing exemplary embodiments are merely exemplary and are not to be construed as limiting. The present teaching can be readily applied to other types of apparatuses. Also, the description of the exemplary embodiments of the present inventive concept is intended to be illustrative, and not to limit the scope of the claims.

What is claimed is:
1. A flexible apparatus, comprising:
   a flexible display;
   a sensor configured to sense deformation of the flexible apparatus; and
   a controller configured to:
      control the flexible display to display a plurality of objects and a plurality of interaction guides, each of the plurality of interaction guides corresponding to each of the plurality of objects and comprising a line image guide displayed in a corresponding object of the plurality of objects and not displayed outside a boundary of the corresponding object of the plurality of objects, and in response to deformation of the flexible apparatus corresponding to one of a plurality of line images guides being sensed, identify an application associated with an object corresponding to the sensed deformation, and control the flexible display to display an execution screen of the identified application, wherein the interaction guides indicate at least one of a bending location and a bending angle for an execution application corresponding to an object.

2. The flexible apparatus of claim 1, further comprising:
an interface configured to connect to a display apparatus,
wherein the controller is configured to transmit information regarding at least one object of the plurality of objects and an interaction guide of the plurality of interaction guides added to the at least one object to the display apparatus, and is configured to transmit controlling signals to the display apparatus instructing a controlling operation based on a bending, when the bending is sensed.

3. The flexible apparatus of claim 1, further comprising:
a graphic processor configured to provide a screen comprising at least one object of the plurality of objects added with an interaction guide of the plurality of interaction guides,
wherein the flexible display displays the screen.

4. The flexible apparatus of claim 3, wherein the interaction guide displays a bending which is uniquely set with respect to each of the at least one object.

5. The flexible apparatus of claim 3, wherein the interaction guide displays a bending which is differently set according to a displayed position of each of the at least one object on the screen.

6. The flexible apparatus of claim 3, wherein the controller equally sets a bending previously set with respect to each displayed position of each of the at least one object on the screen, to each of new objects which are newly displayed on another screen according to the displayed position, and
the interaction guide is added to the new objects and displayed on the another screen based on the bending set with respect to the new objects.

7. The flexible apparatus of claim 3, wherein the objects are application icons, and the controller provides an application corresponding to the at least one object, when a bending set with respect to the objects is sensed.

8. The flexible apparatus of claim 3, wherein the screen comprises an input area to input characters or symbols,
the at least one object are buttons to input the characters and the symbols, and
the controller displays characters or symbols corresponding to the at least one object in the input area, when a bending set with respect to the objects is sensed.

9. The flexible apparatus of claim 3, wherein the interaction guide comprises a line image guide wherein at least one of a line width, a line number, a line shape, a line direction, a line position, a line angle, a line color, a line size, and a line length is adjusted according to a characteristic of a bending.

10. The flexible apparatus of claim 9, wherein the interaction guide further comprises at least one of a character guide and a symbol guide which are displayed with the line image guide.

11. A control method of a flexible apparatus, the method comprising:

providing a screen on a flexible display which comprises at least one object and a bending interaction guide;
sensing a deformation of the flexible apparatus;
controlling the flexible display to display a plurality of objects and a plurality of interaction guides, each of the plurality of interaction guides corresponding to each of the plurality of objects and comprising a line image guide displayed in a corresponding object of the plurality of objects and not displayed outside a boundary of the corresponding object of the plurality of objects; and in response to deformation of the flexible apparatus corresponding to one of a plurality of line image guides being sensed, identifying an application associated with an object corresponding to the sensed deformation, and controlling the flexible display to display
an execution screen of the identified application,
wherein the interaction guides indicate at least one of a bending location and a bending angle for an execution application corresponding to an object.

12. The control method of claim 11, wherein the providing the screen comprises transmitting information to a display apparatus which is connected to the flexible apparatus regarding an at least one object of the plurality of objects and an interaction guide of the plurality of interaction guides added to the at least one object, and displaying the screen through the display apparatus.

13. The control method of claim 11, wherein the providing the screen further comprises:
providing a screen which comprises at least one object of the plurality of objects respectively added with an interaction guide of the plurality of interaction guides; and
displaying the screen through the flexible display.

14. The control method of claim 13, wherein the interaction guide displays a bending which is uniquely set with respect to each of the at least one object.

15. The control method of claim 13, wherein the interaction guide displays a bending which is differently set according to marking position of each of the at least one object on the screen.

16. The control method of claim 13, further comprising equally setting a bending, which is previously set with respect to each displayed position of each of the at least one object on the screen, to each of new objects which are newly displayed on another screen according to the displayed position; and
adding the interaction guide to the new objects based on the bending set with respect to the new objects.

17. The control method of claim 13, wherein
the at least one object is an application icon, and
wherein an application corresponding to the at least one object is provided when a bending set with respect to the at least one object is sensed.

18. The control method of claim 13, wherein
the screen includes an input area to input characters or symbols,
the at least one object is a button to input the characters or the symbols, and
wherein characters or symbols corresponding to the at least one object are displayed on the input area, when a bending set with respect to the at least one object is sensed.

19. The control method of claim 13, wherein the interaction guide comprises a line image guide in which at least one of a line width, a line number, a line shape, a line direction, a line position, a line angle, a line color, a line size, and a line length is adjusted according to a characteristic of a bending.

20. The control method of claim 13, wherein the interaction guide further comprises at least one of a character guide and a symbol guide which are displayed with the line image guide.

21. A method of operating a display apparatus, the method comprising:
- displaying, on a flexible screen, objects added with interaction guides;
- receiving a controlling signal corresponding to a deformation of a flexible apparatus;
- controlling the flexible apparatus to display a plurality of objects and a plurality of interaction guides, each of the plurality of interaction guides corresponding to each of the plurality of objects and comprising a line image guide displayed in a corresponding object of the plurality of objects and not displayed outside a boundary of the corresponding object of the plurality of objects; and
- in response to deformation of the flexible apparatus corresponding to one of a plurality of line image guides being sensed, identifying an application associated with an object corresponding to the sensed deformation, and controlling the flexible apparatus to display an execution screen of the identified application,
- wherein the interaction guides indicate at least one of a bending location and a bending angle for an execution application corresponding to an object.

* * * * *